United States Patent [19]
Fukushima

[11] Patent Number: 5,177,620
[45] Date of Patent: Jan. 5, 1993

[54] FACSIMILE APPARATUS CAPABLE OF STORING DATA

[75] Inventor: Shigenobu Fukushima, Osaka, Japan

[73] Assignee: Minolta Camera Kabushiki Kaisha, Osaka, Japan

[21] Appl. No.: 487,769

[22] Filed: Mar. 2, 1990

[30] Foreign Application Priority Data

Mar. 4, 1989 [JP]  Japan .................................. 1-52585

[51] Int. Cl.⁵ .............................................. H04N 1/00
[52] U.S. Cl. ..................... 358/404; 358/406; 358/468; 358/400
[58] Field of Search ............... 358/404, 437, 444, 486, 358/434, 436, 443, 400, 403, 406, 441, 468, 476

[56] References Cited

U.S. PATENT DOCUMENTS 4,743,975  5/1988  Ijuin ..................................... 358/486
4,907,094  3/1990  Mishima et al. ..................... 358/404

FOREIGN PATENT DOCUMENTS 60-8670   3/1985  Japan .
61-34712  8/1986  Japan .

OTHER PUBLICATIONS

Catalogue of "NEFAX D45".

Primary Examiner—Edward L. Coles, Sr.
Assistant Examiner—Thomas D. Lee
Attorney, Agent, or Firm—Willian Brinks Olds Hofer Gilson & Lione

[57] ABSTRACT

A facsimile apparatus according to the present invention comprises a receiving device for receiving image data from a transmitter-side, a memory device for storing the image data received by the receiving device, a detecting device for detecting that the image data stored in the memory device have reached a predetermined amount, a printer for printing out the image data stored in the memory device and a control device for activating the printer in response to detection output of the detecting device.

14 Claims, 22 Drawing Sheets

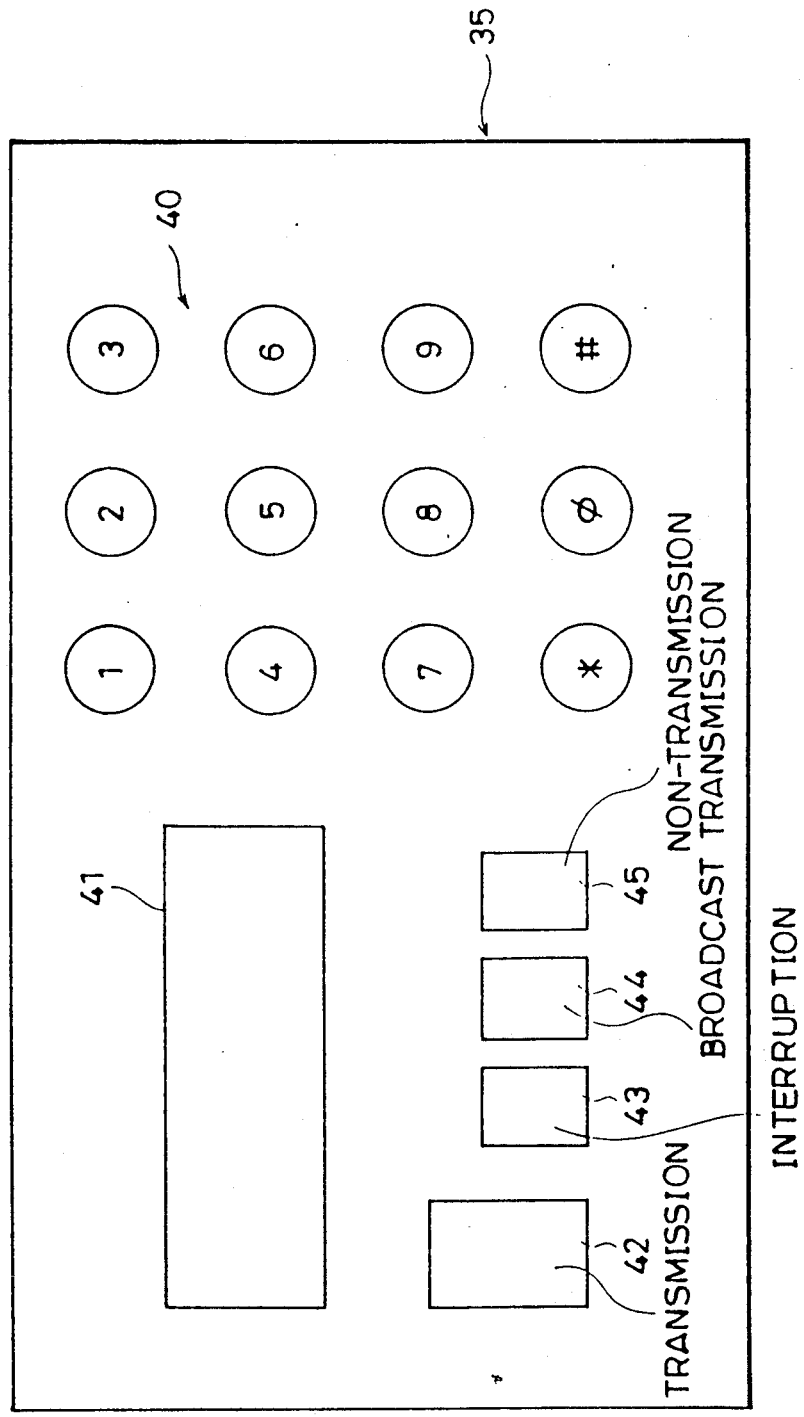

FIG. 3

| Box | Label |
|---|---|
| SPECIFY DESTINATION | DISPLAY a |
| HOW MUCH WIDTH OF LOWER EDGE NOT TRANSMITTED IN mm ? | DISPLAY b |
| UPON PRINTING STOP INTERRUPTION IS POSSIBLE | DISPLAY c |
| PRINTING | DISPLAY d |
| PRINTING COMPLETED | DISPLAY e |
| READING | DISPLAY f |
| TRANSMITTING | DISPLAY g |
| RECEIVING | DISPLAY h |
| TRANSMISSION COMPLETED | DISPLAY i |
| RECEPTION COMPLETED | DISPLAY j |
| READING COMPLETED | DISPLAY k |

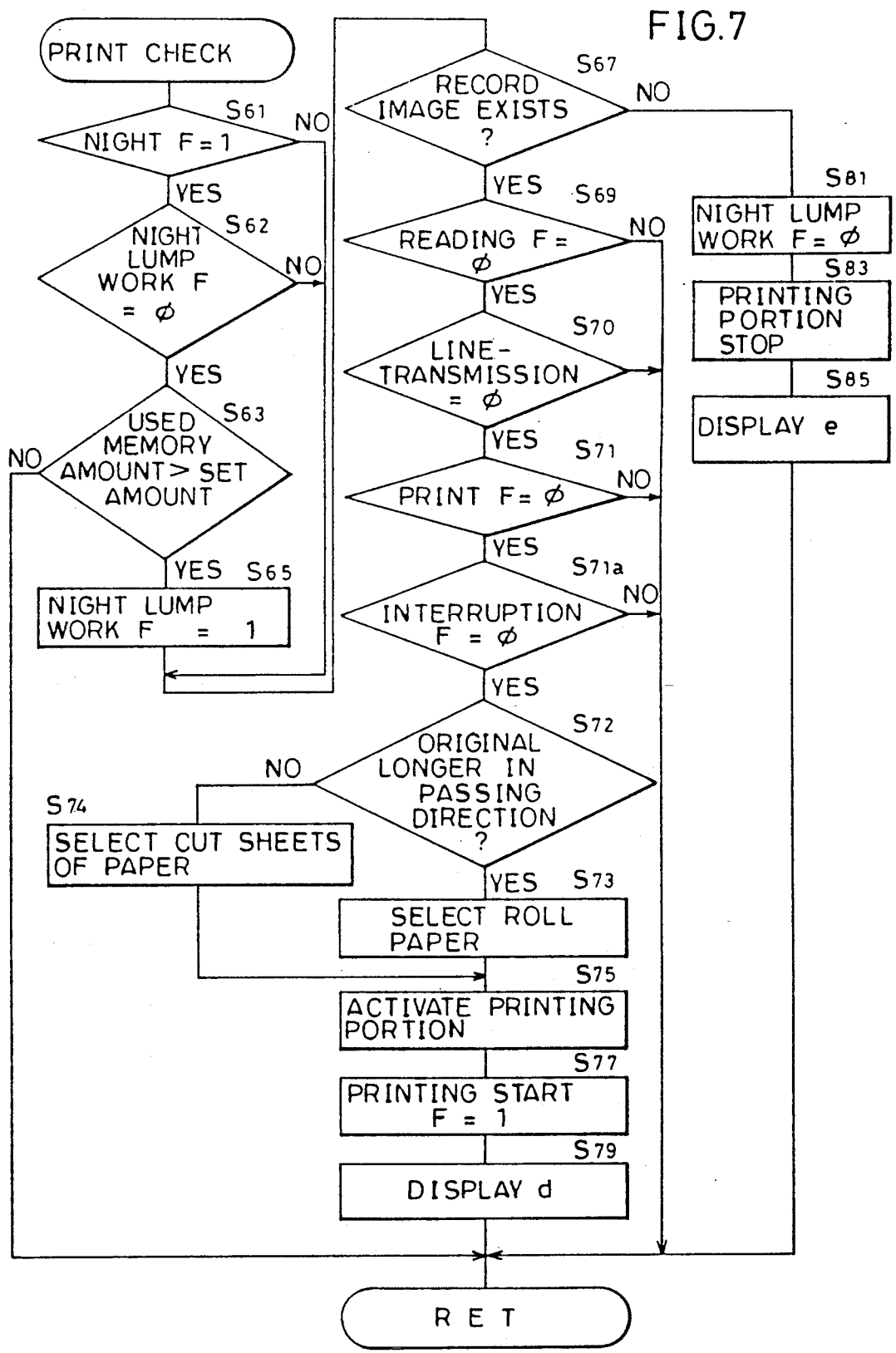

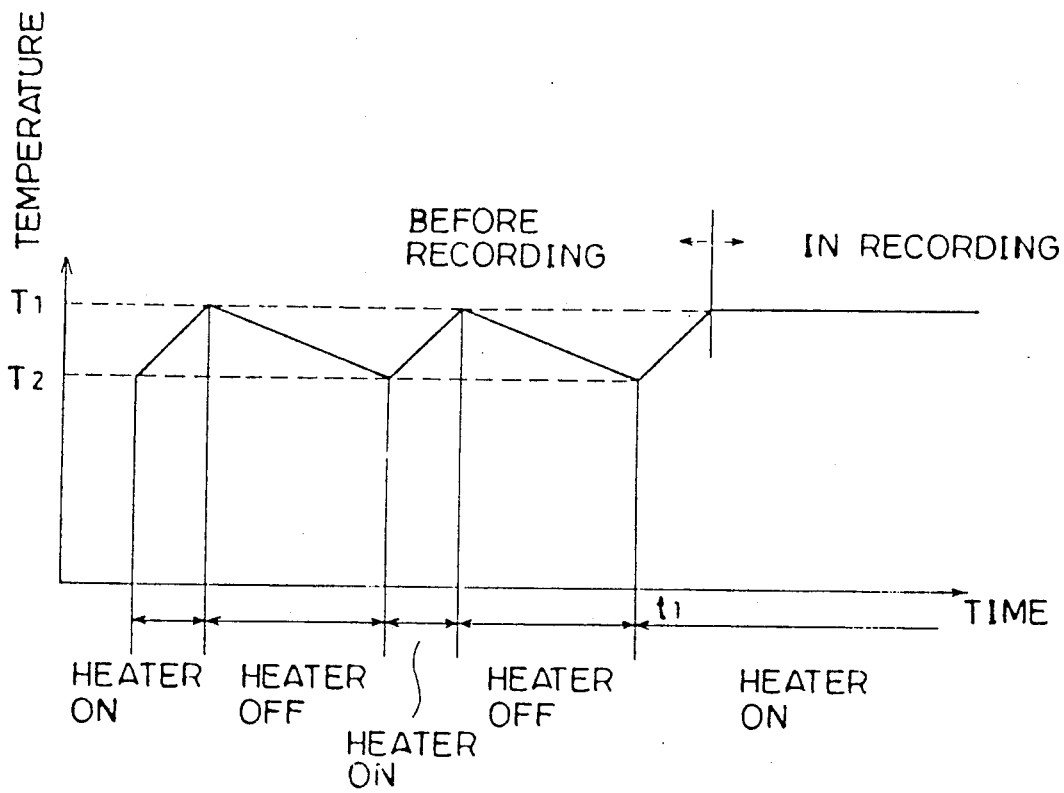
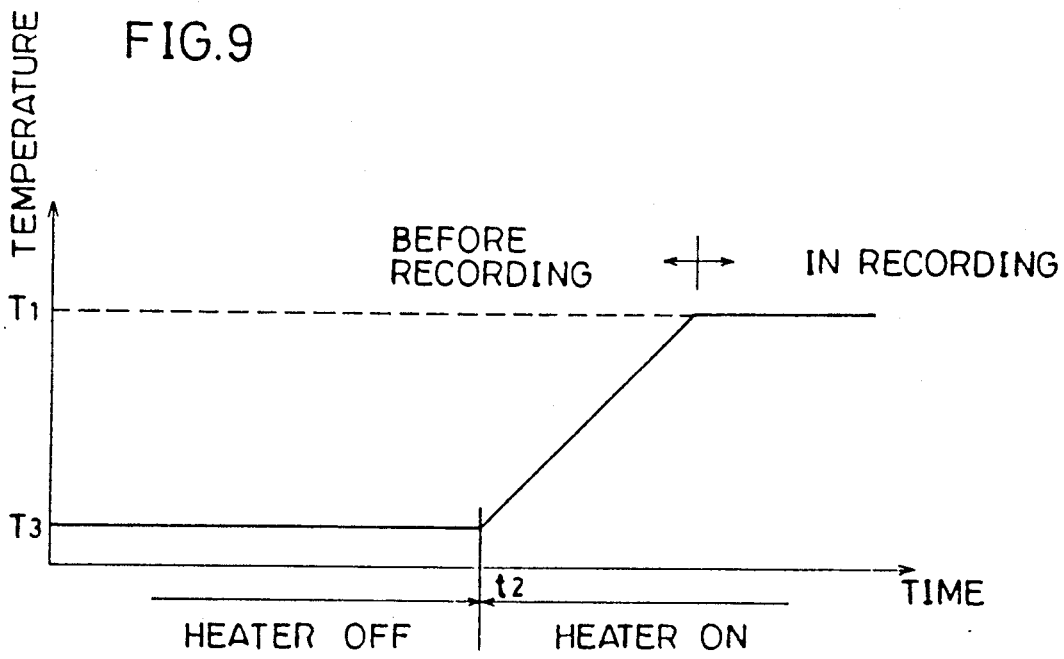

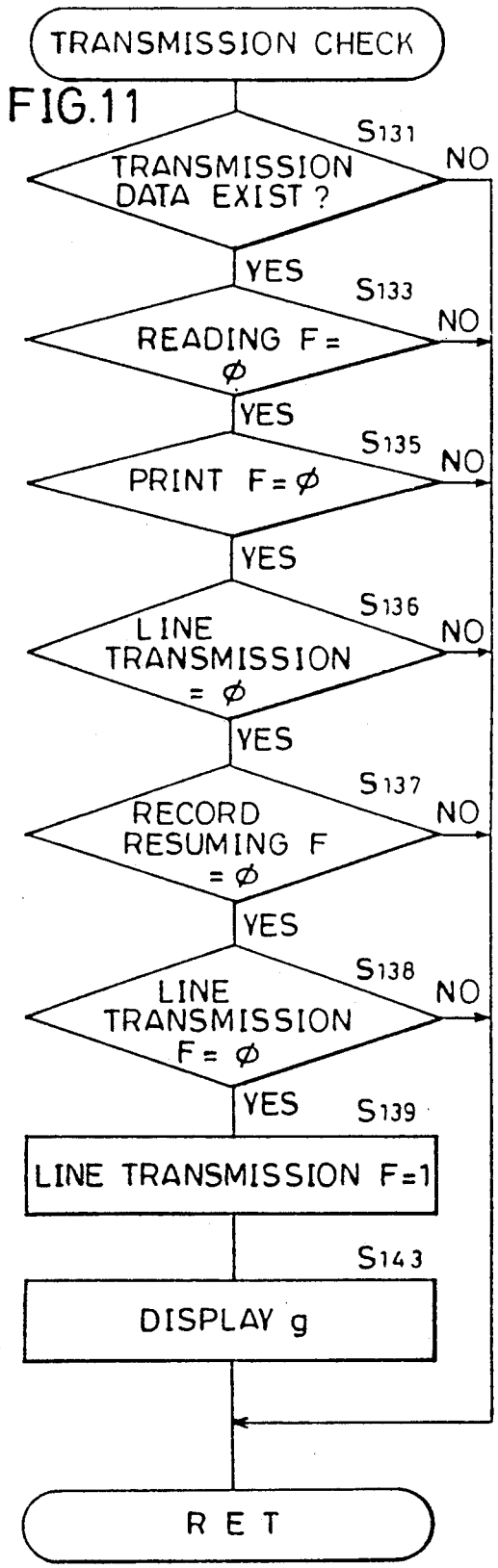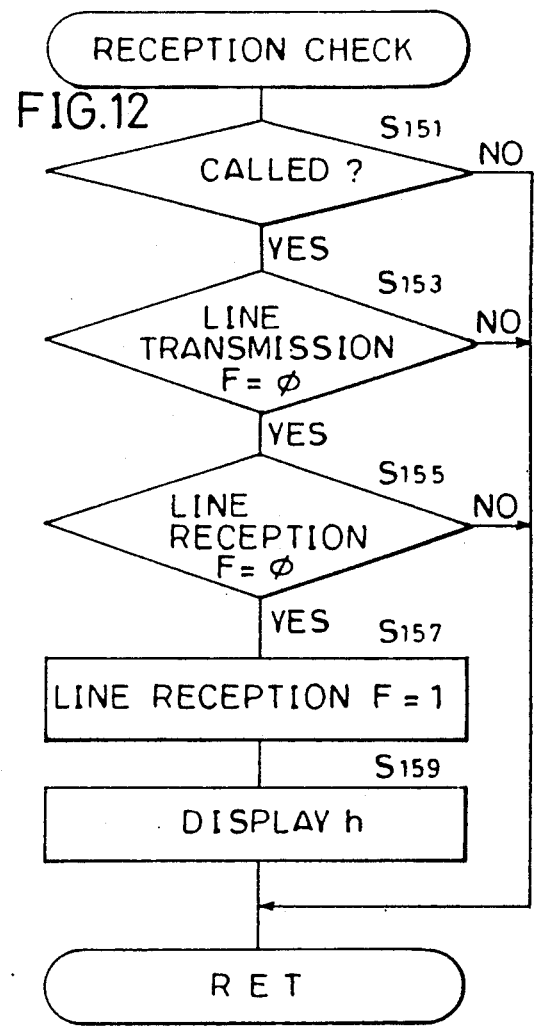

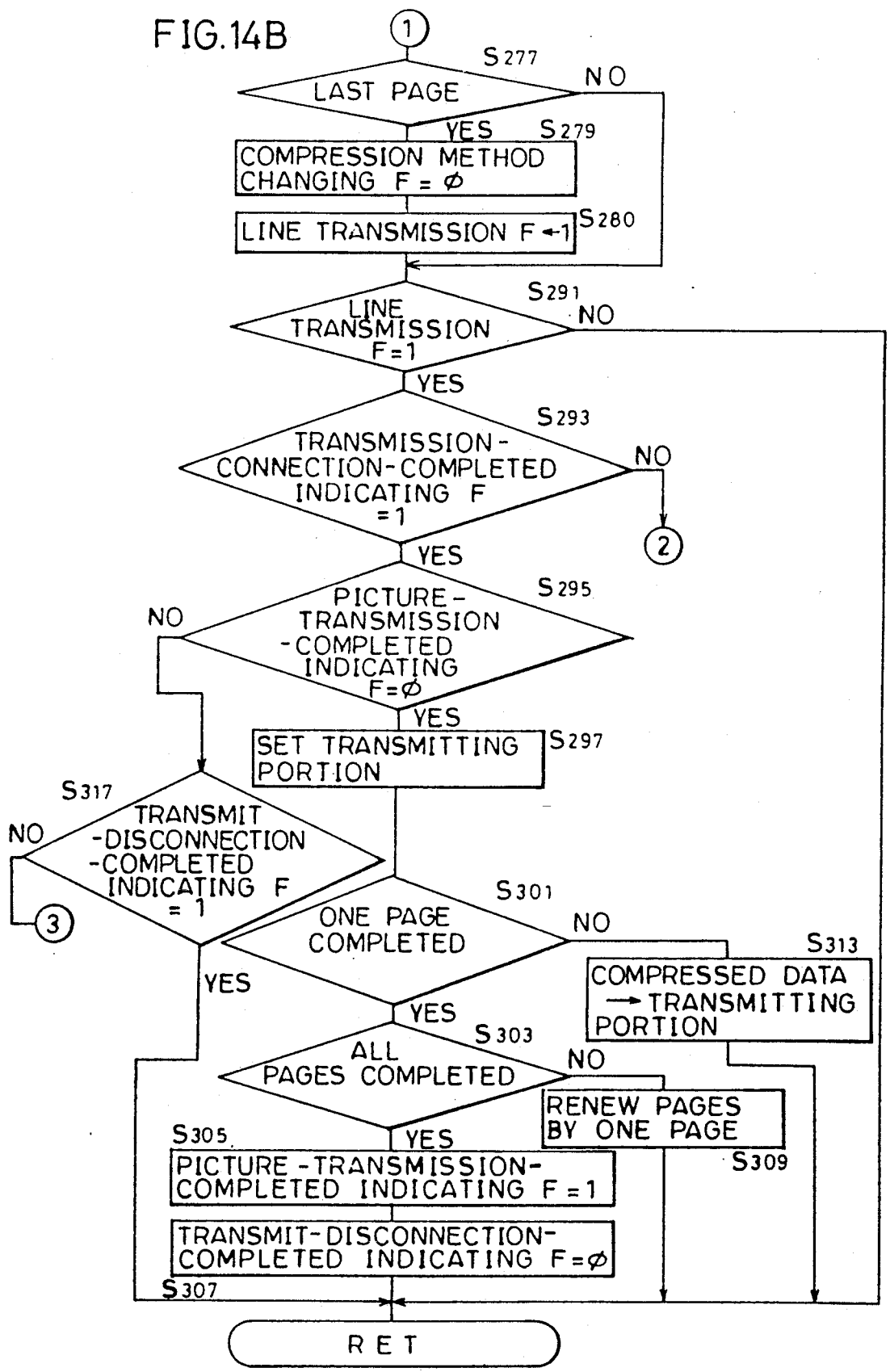

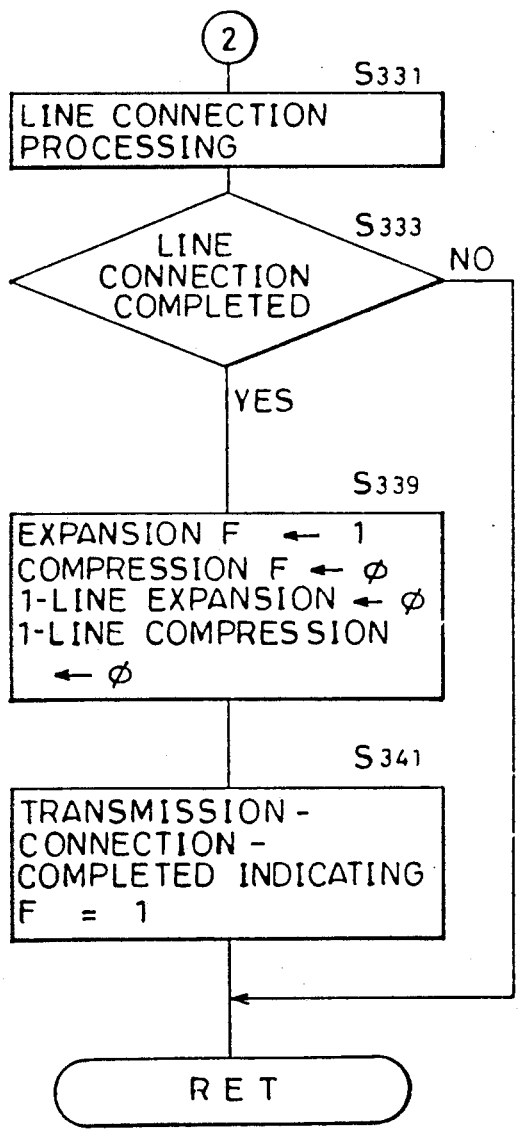
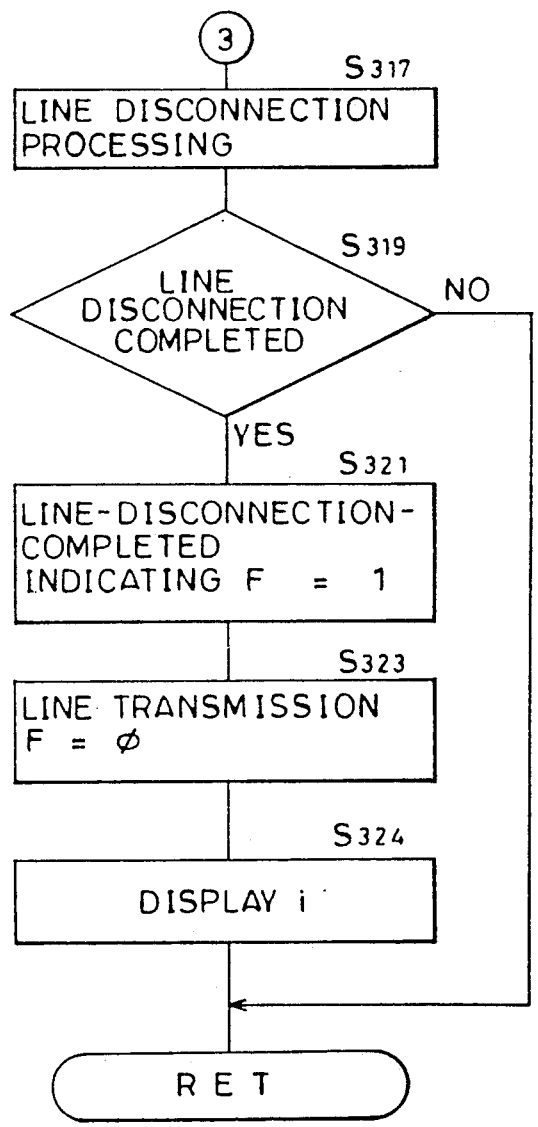

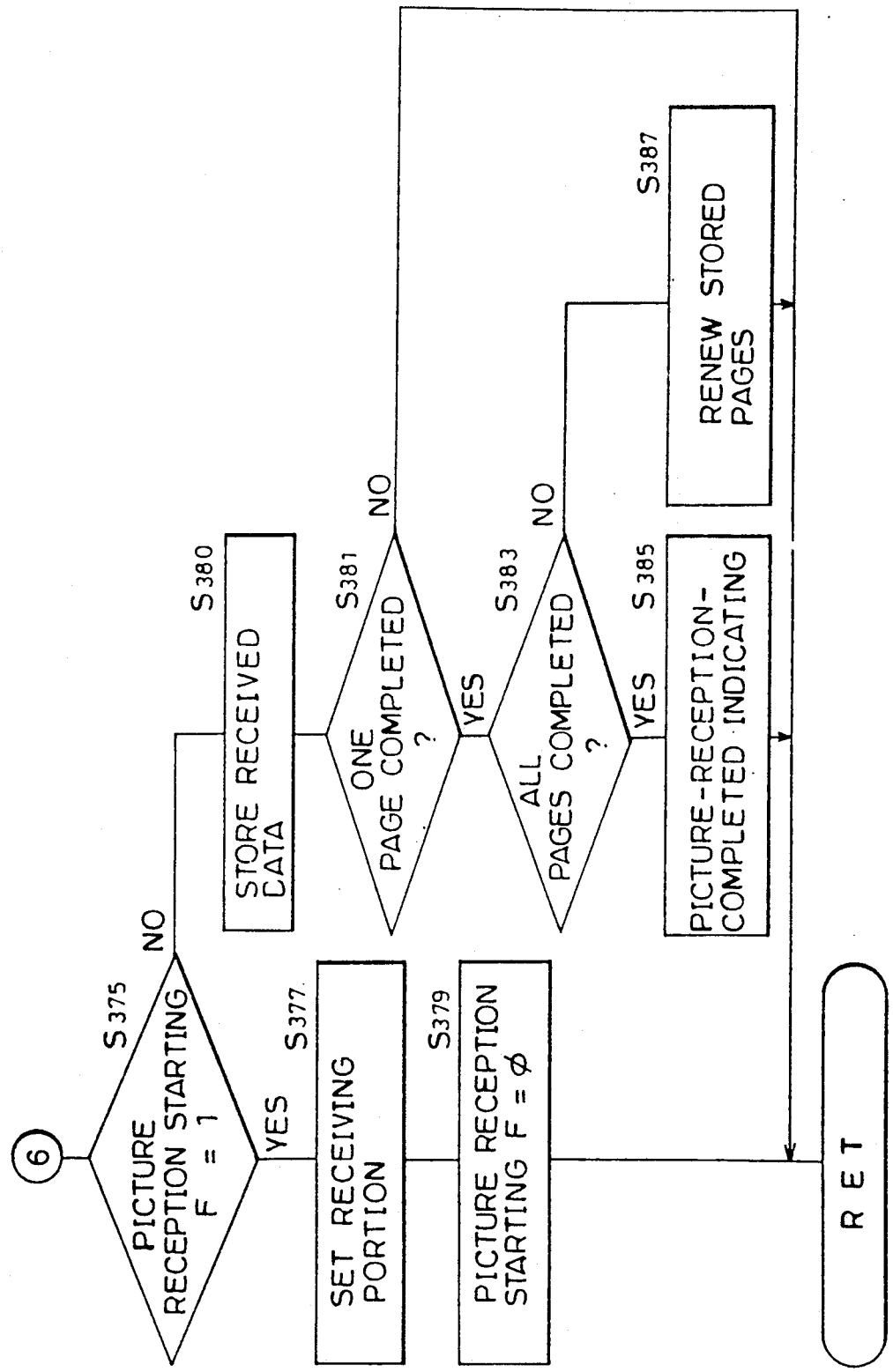

FIG.17A
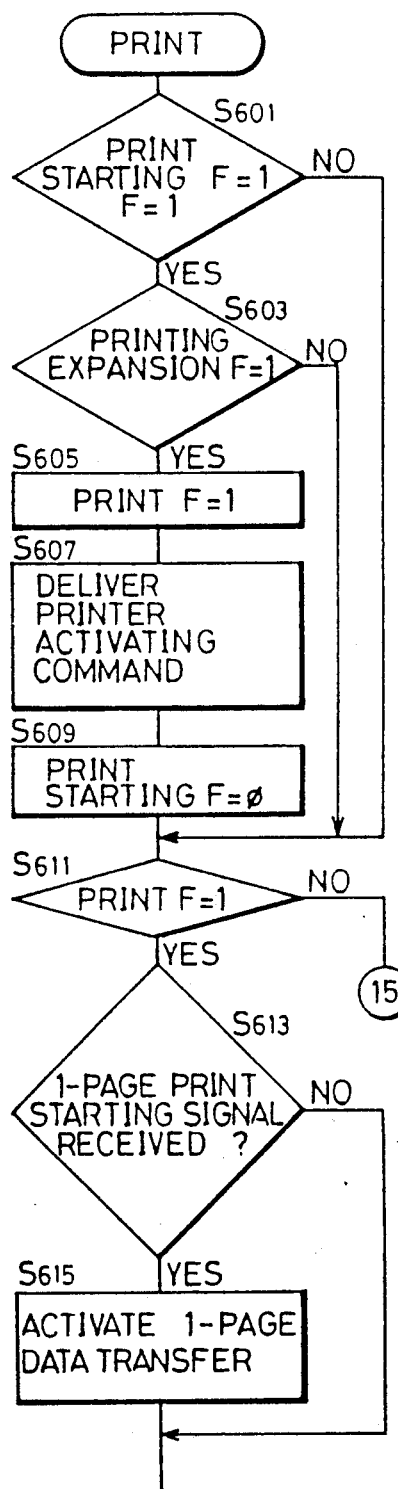
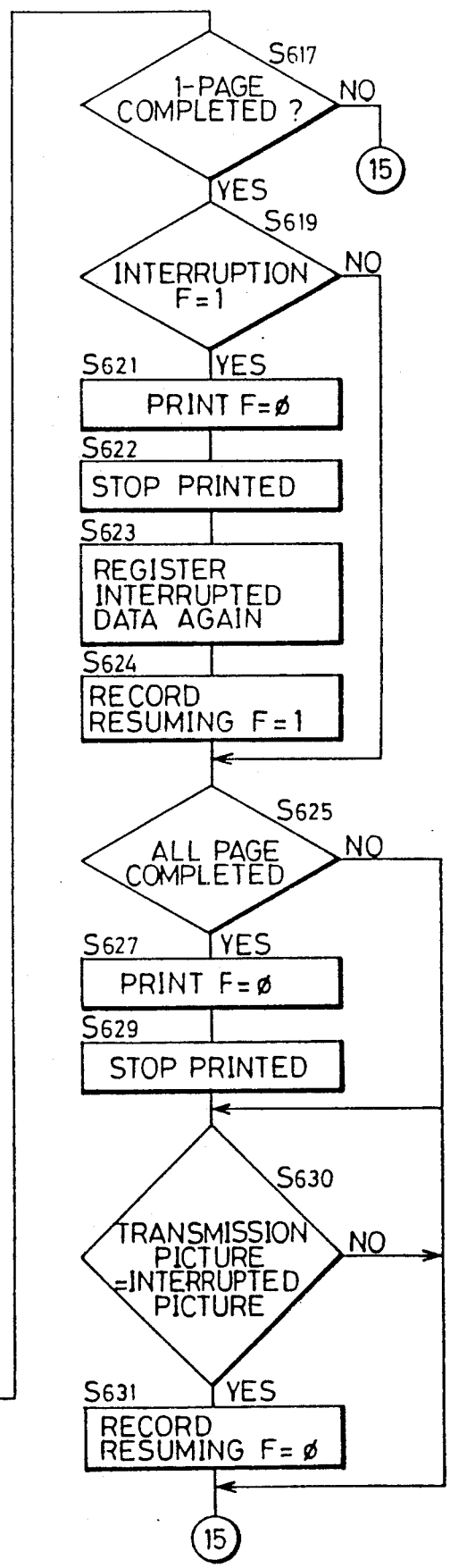

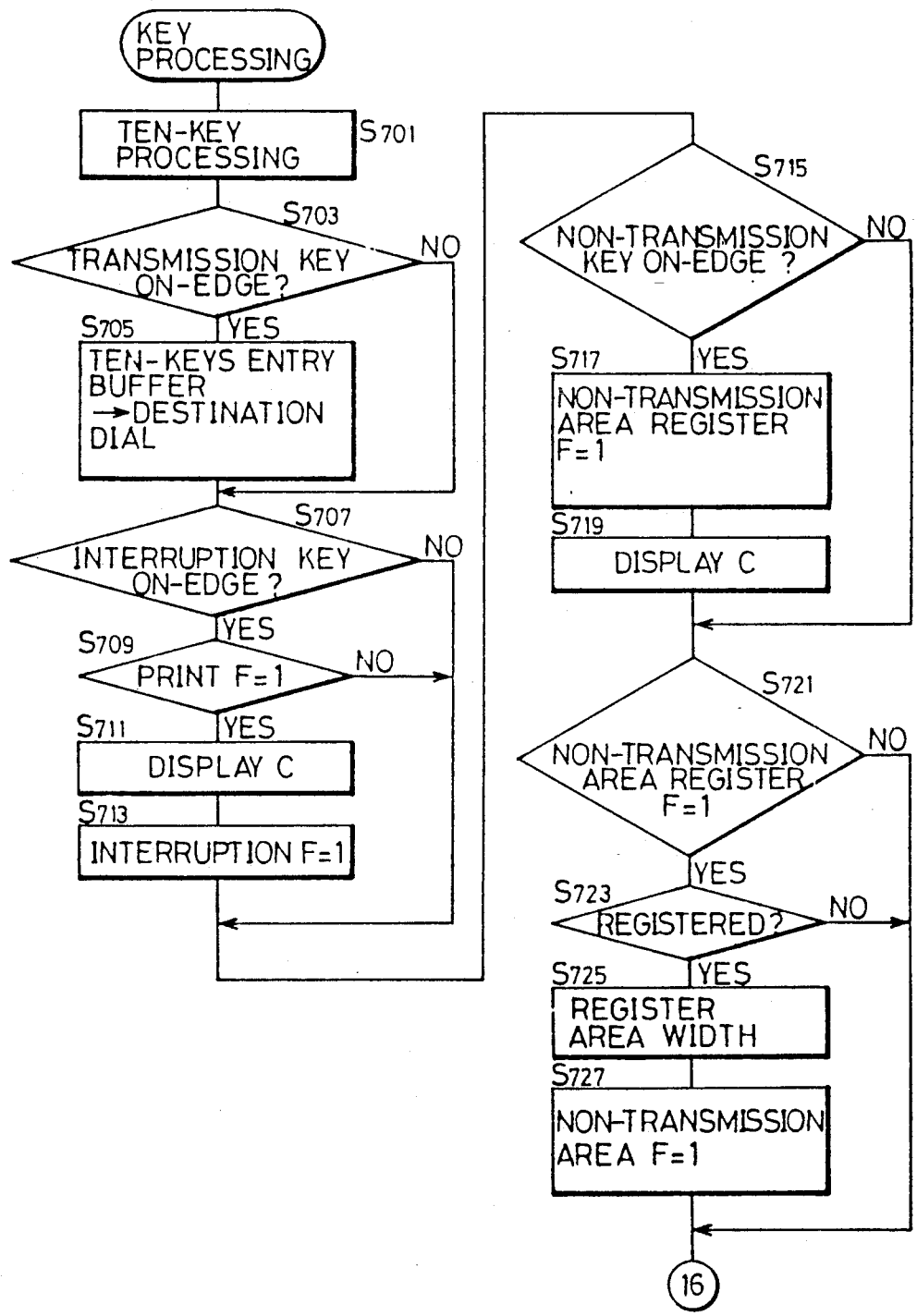

FACSIMILE APPARATUS CAPABLE OF STORING DATA

BACKGROUND OF THE INVENTION

1. Field of the Invention

The present invention generally relates to facsimile apparatuses, and more particularly, to a facsimile apparatus which can record received image data in a lump when they reach a predetermined amount.

2. Description of the Related Art

A conventional facsimile apparatus sequentially records received image data on recording paper each time it receives a signal, making the most of its responsiveness.

With a facsimile apparatus as described above, even in case of a reception that does not require the responsiveness, for example those in the night or holidays when the received information is not immediately needed, the same record processing is performed as in the regular time. Therefore, each time a signal is received, a mechanism around the recording portion operates. For example, those components that require remaining temperature in order to enable fast printing operation, such as a heater portion and the like, need to be adjusted to continuously hold their remaining temperatures within a certain temperature range, irrespective of reception. This is disadvantageous in view of electric energy saving. Furthermore, the respective components of the recording portion have to perform an additional operation for the temperature holding and this is disadvantageous also in consideration of durability of the respective parts.

SUMMARY OF THE INVENTION

An object of the present invention is to enhance durability of a facsimile apparatus.

Another object of the present invention is to save consumption energy in a facsimile apparatus.

In order to attain the above-mentioned objects, a facsimile apparatus according to the present invention comprises receiving means for receiving image data from a transmitter-side, storage means for storing the image data received by the receiving means, detecting means for detecting that the image data stored in the storage means has reached a predetermined amount, recording means for printing out the image data stored in the storage means, and control means for activating the recording means in response to detection output of the detecting means.

A facsimile apparatus constituted as described above prints out received image data when they reach a predetermined amount and thus reduces rate of the operation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a plan view of the operation panel 35 in FIG. 1.

FIG. 3 is a specific diagram showing display contents at the display portion 41 in FIG. 2.

FIG. 7 is a flow chart showing specific contents of the print check subroutine in FIG. 5.

FIG. 8 is a diagram showing temperature control of a fixing roller in a laser printer of the facsimile apparatus in FIG. 1, in the regular time other than night, holidays or the like.

FIG. 9 is a diagram showing temperature control of the fixing roller in the laser printer in the night, holidays or the like, in contrast with FIG. 8.

FIG. 11 is a flow chart showing specific contents of the transmission check subroutine in FIG. 5.

FIG. 12 is a flow chart showing specific contents of the reception check subroutine in FIG. 5.

FIGS. 14A to 14D are flow charts showing specific contents of the transmission processing subroutine in FIG. 6.

FIGS. 15A and 15B are flow charts showing specific contents of the reception processing subroutine in FIG. 6.

FIGS. 17A and 17B are flow charts showing specific contents of the print processing subroutine in FIG. 6.

FIGS. 18A and 18B are flow charts showing specific contents of the key processing subroutine in FIG. 6.

DESCRIPTION OF THE PREFERRED EMBODIMENTS

Figure 1:
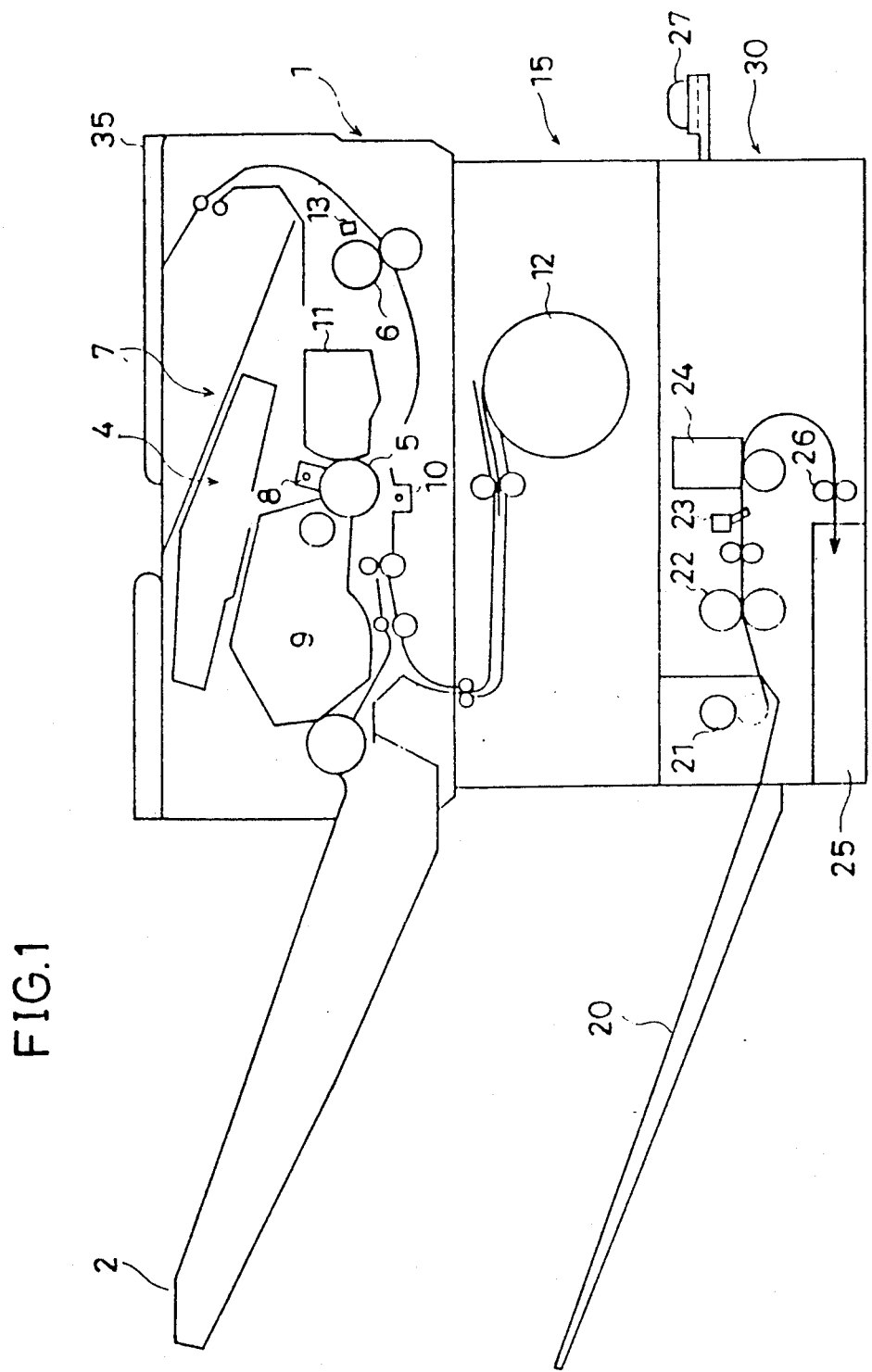
FIG. 1 is a sectional view of a facsimile apparatus according to an embodiment of the present invention.

FIG. 1 is a sectional view of a facsimile apparatus according to an embodiment of the present invention.

This facsimile apparatus is generally divided into a recording portion 1 and a reading portion 30 in view of its functional aspect.

The recording portion 1 is comprised of a laser beam printer, the operation of which will be briefly described below.

First, data that have been received through a hand set 27 connected to a telephone line are converted into emitting operation by a laser of an optical system 4. A charger 8 uniformly charges a photoreceptor drum 5 on which an electrostatic latent image is formed through illumination by the laser beam of the optical system 4. Toner in a developing unit 9 is then attached to this electrostatic latent image. Meanwhile, a paper feed cassette 2 has cut sheets of paper stored therein which are fed into the recording portion 1 one by one with a roller and the like. Instead of the paper feed cassette 2, a roll paper feed unit 15 which is provided under the recording portion 1 and has roll paper and a cutter incorporated therein may also be used. When paper is fed from the roll paper 12, it has toner transferred thereon and is then cut at an appropriate length by the cutter 13 before being discharged. To return the leading edge of the just cut paper to a record starting position in preparation for the subsequent record, the roller and the like are reversed. The toner having been attached to the photoreceptor drum 5 is transferred to paper (a cut sheet of paper or the roll paper) by a transfer charger 10 and fixed thereon by a fixing device 6. After the fixing, the paper is discharged into a tray 7. The toner that has remained unattached to the paper is collected by a cleaner 11. The above is one cycle of the printing operation.

In the following, operation of the reading portion 30 will be described.

Originals put on an original image tray 20 are detected by a sensor (not shown), based on a transmission command at the operation panel 35 provided on the upper surface of the recording portion 1, and conveyed, one by one, to the position of a sensor 23 by rollers 21 and 22. Rotation of the roller 22 by a motor (not shown) is synchronized with start of reading by an image sensor 24 to read image data of an original which are converted into digital image data. After the reading, the original is discharged to a discharge portion 25 by a discharge roller 26. According to the present embodiment, the rollers 22 and 26 are driven by the same driving system to discharge the original from which the image data have been read out, in preparation for the reading operation for the subsequent original. The image information read out at the reading portion 30 is transmitted to the telephone line through the hand set 27.

FIG. 2 is a plan view of the operation panel 35 in FIG. 1.

In the diagram, the operation panel comprises a ten-key group 40 for entering telephone number or the like of a destination, a display portion 41 for displaying instructions of operation procedure, destination telephone number or the like, a transmission key 42 for giving an instruction of transmission start after an original is set or destinations are specified, an interruption key 43 for giving an instruction of additional destinations for the broadcast transmission, a broadcast transmission key 44 for effecting a broadcast transmission, and a non-transmission key 45 for giving an instruction not to transmit image data of a predetermined area.

FIG. 3 is a diagram showing specific examples of the contents displayed at the display portion 41 in FIG. 2.

Figure 4:
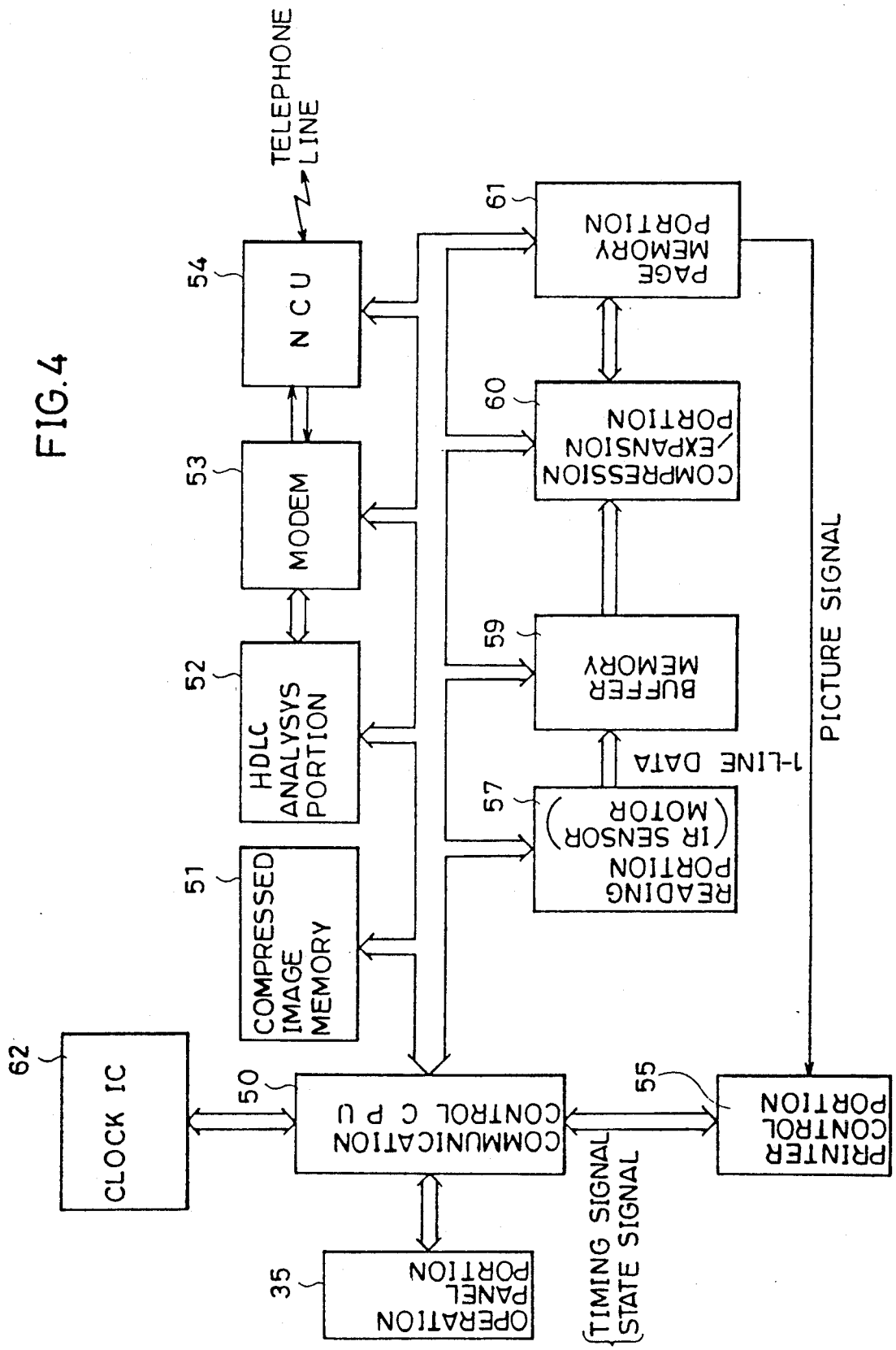
FIG. 4 is a block diagram of a control portion of the facsimile apparatus in FIG. 1.

FIG. 4 is a block diagram showing structure of the control portion of the facsimile apparatus in FIG. 1.

In the following, the structure and operation of the control portion will be described.

The control portion generally comprises the communication control CPU 50, the operation panel portion 35 and a printer control portion 55 which are connected to each other through a communication path for transmitting several kinds of mode information and through a timing signal line for transmitting several kinds of timing. The communication control CPU 50 is connected to several other blocks as shown in the diagram through buses.

First, when an original is put on the original tray 20, it is detected by a sensor of a reading portion 57 and the detected information is transmitted to the CPU 50. The CPU 50 gets, based on the detected information, the display portion 41 of the operation panel 35 to display a request for entry of FAX number of a destination. After the entry of FAX number, a motor and an IR unit of the reading portion 57 are synchronized to read the original whereby obtaining image signals for every one line. The one-line data are supplied to a buffer memory 59. Further, the image data in the buffer memory are compressed in a compressing/expanding portion 60 before being stored in a compressed image memory 51. Upon completion of the original reading, the CPU 50 calls a facsimile apparatus on a receiver-side through a modem 53, a NCU 54 and the telephone line. After the telephone line is connected, the compressed data stored in the compressed image memory 51 are supplied to the compressing/expanding portion 60 to be expanded therein and then stored in a page memory portion 61 as the image data before the compression. Subsequently, the stored image data undergoes an automatic scale-down processing according to record sheet size inherent to the receiver-side facsimile apparatus. The scaled-down data are further compressed in the compressing/expanding portion 60 according to a coding system of the receiver-side facsimile apparatus and again stored in another memory area of the compressed image memory 51. These operations of expansion and compression are performed alternately for every one block unit comprising several-line data.

While the compression is performed according to the capabilities of the receiver-side facsimile apparatus, the thus obtained compressed data are processed in a HDLC analysis portion 52 according to the HDLC standards and then transmitted to the telephone line through the modem 53 and the NCU 54. After all the images are transmitted, the line is disconnected according to a disconnection procedure to terminate the transmission processing.

Next, the receiving operation will be described.

When a transmitter-side facsimile apparatus calls this facsimile apparatus through the telephone line, line connection is made according to a communication procedure. After completion of the line connection, image data transmitted from the transmitter-side facsimile apparatus are transferred to the HDLC analysis portion 52 through the NCU and the modem and therein returned to simple compressed data to be stored in the compressed image memory 51. After the reception of all the image data is completed, the line is disconnected according to the communication procedure.

After the disconnection of the line, the image data are supplied from the compressed image memory 51 to the compressing/expanding portion 60 to be sequentially expanded therein, and then stored in the page memory 61 as actual image data. At the same time, the CPU 50 activates the printer control portion 55 and transfer of the image signals from the page memory 61 to the printer control portion begins. It is to be noted, however, that after completion of one-page expansion, the expansion in the compressing/expanding portion 60 is suspended until the transfer of one-page data is completed. This is due to the necessity to prevent overwriting of the expanded data since the page memory portion has an area for only one page.

When printing of all the compressed image data in the recording portion 1 is completed in the above-mentioned manner, the receiving operation comes to an end.

Figure 5:
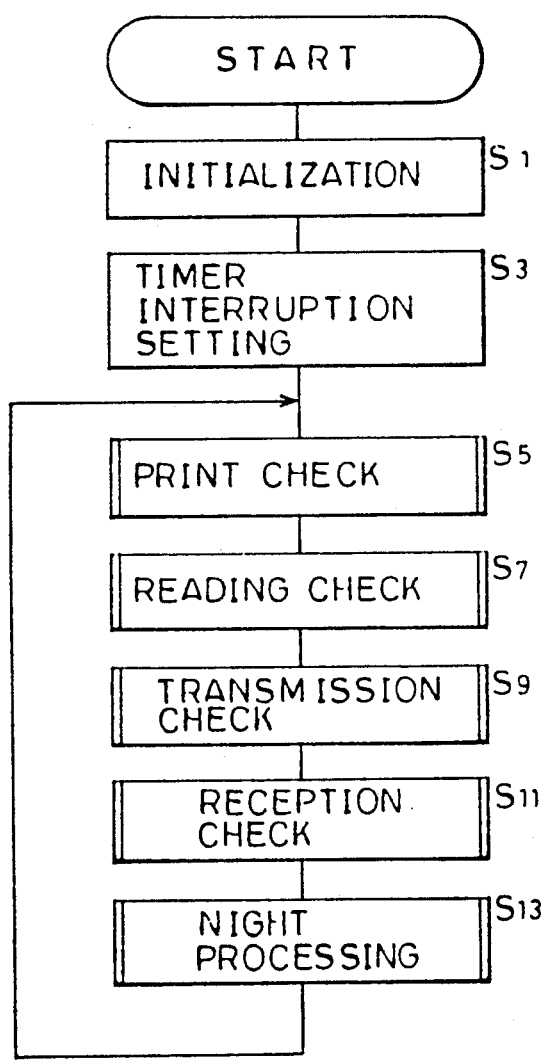
FIG. 5 is a main flow chart showing control contents of the communication control CPU 50 shown in FIG. 4.

FIG. 5 is a main flow chart giving an outline of control by the communication control CPU 50 shown in FIG. 4.

Before description is made of the flow chart, a term "on-edge" will be defined: a changing state, or a state in which a switch, a sensor, a signal or the like changes from the on-state to the off-state will be defined as "on-edge".

First, at step S1, a register, several input/output ports, several flags and the like are initialized. Next, at step S3, timer interruption for periodically calling an interruption service routine as will be described later is set. Steps S5 through S13 represent several check routines for ensuring desired processings of the respective sequences contained in the interruption service routine (for example, ensuring reading when it is to be executed). When the processings are completed until S13, the operation returns again to S5 to repeat the same check routines. Details of the respective check routines will be described later.

Figure 6:
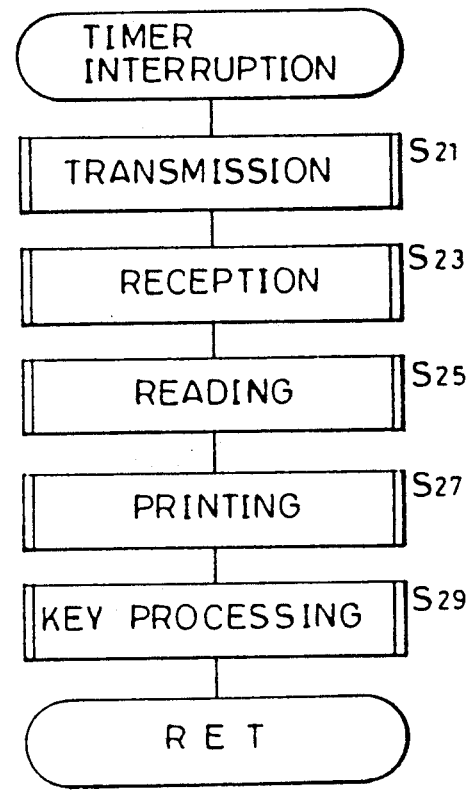
FIG. 6 is a diagram showing the timer interruption subroutine set in FIG. 5.

FIG. 6 shows the timer interruption service routine set in FIG. 5.

This service routine comprises five subroutines of transmission, reception, reading, printing and key processing as shown by the steps S21 to S29, details of which will be described later.

FIG. 7 is a flow chart showing specific contents of the print check subroutine in FIG. 5.

First, at step S61, setting state of a night flag is determined. Meaning of the night flag itself will be described later. If the night flag has been set, then at step S62, setting state of a night lump work flag is determined.

When the night lump work flag has been set, image data received by the facsimile apparatus in the night are stored in the compressed memory portion, until they reach a definite amount and then printed out in a lump. This means, for example in the present embodiment, only a temporal on-state of a heater is required for driving the laser beam printer, so that frequency of turning the heater on can be reduced, advantageously saving energy.

FIG. 8 is a diagram showing temperature control of the fixing roller by the heater of the laser printer in the regular time other than night, holidays and the like, in the facsimile apparatus according to an embodiment of the present invention.

In order to enable the fixing roller to reach in a short time a temperature $T_1$ which allows recording, the heater is repeatedly turned on and off in the regular time such that when temperature of the roller falls to a temperature $T_2$ a little below the temperature $T_1$, the heater is turned on, and the on-state of the heater is maintained until the temperature of the roller reaches $T_1$ When the recording operation of the printer begins (on and after the time $t_1$), the roller is controlled by the heater such that the temperature is held at $T_1$ once it is reached.

FIG. 9 is a diagram showing temperature control of the roller by the heater of the laser beam printer in the night, holidays or the like in the facsimile apparatus according to an embodiment of the present invention.

In a stand-by state where no recording operation is performed, for example in the night, the heater is turned off. Therefore, the normal temperature of the roller is $T_3$. At the time $T_2$ when the recording operation of the printer is required to start, the heater is turned on and controlled such that the temperature is held at $T_1$. It takes a longer time for the roller to reach the temperature $T_1$ than in the regular time and correspondingly the recording operation requires a longer time. This does not lead to any problem, however, since substantial processing of the recording paper is not executed, for example, in the night. Since various methods are already well-known for the temperature control itself, details thereof will not be referred to herein.

Turning now back to the flow chart of FIG. 7, if the night lump work flag has been reset at step S62, the operation enters step S63, where the amount of used memory is checked against a set amount. If the used memory amount has reached the set amount (YES at step S63), the night lump work flag is set at step S65. On the other hand, if the used memory amount has not yet reached the set amount, the night lump work flag is not set, but the operation returns to the main routine.

At step S67, existence of an image to be recorded (printed) is checked. If there exist any record image, after resetting state of a reading flag, a line transmission flag, a print flag, and an interruption flag is ensured through steps S69 to S71a, it is determined at step S72 whether the record picture corresponds to an original with a larger length in the passing direction than the regular size. If the record image is determined as such (YES at step S72), the roll paper is selected as recording paper suitable for such an original. If the record image does not correspond to such an original, a cut sheet of paper which is advantageous to file management and the like is selected at step S74. After either recording paper is selected, the print portion is activated (power of the heater or the like of the fixing roller is turned on) at step S75 and a print starting flag is set at step S77. At step S79, the display d shown in FIG. 3 is made to inform an operator that printing is just being carried out. On the other hand, if the reading flag has been set at step S69, the compressing/expanding portion is used for reading so that the operation returns to the main routine immediately without entering the printing operation.

Furthermore, if the line transmission flag has been set at step S70, the compressing/expanding portion is used for transmission, so that the operation returns to the main routine without proceeding any further in this subroutine. If the print flag has been set at step S71, the operation also returns to the main routine immediately since another printing operation has been already started.

If the interrupt flag has been set at step S71a, another original is being read out in an interrupting operation, so that the operation returns to the main routine immediately without entering the printing operation.

On the other hand, if it is determined at step S67 that there exists no record image, the night lump work flag is reset at step S81 to terminate a lump printing operation. At step S83, operation of the printing portion is stopped (heater off), and at step S85, the display e of FIG. 3 is made to inform an operator that the printing operation is completed, and then the operation returns to the main routine. For example in the night, however, this display may be omitted due to absence of operators.

Figure 10:
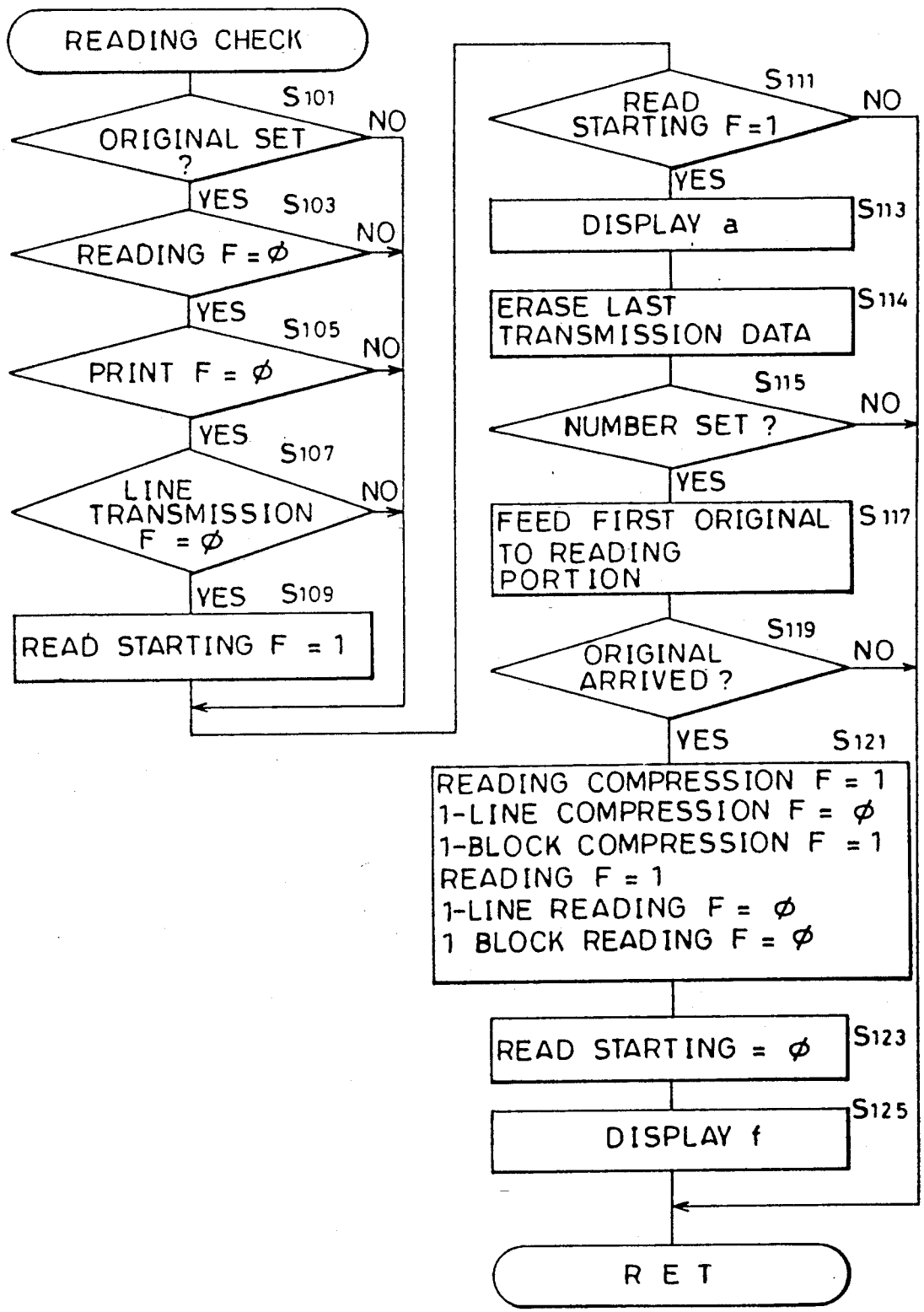
FIG. 10 is a flow chart showing specific contents of the reading-out check subroutine in FIG. 5.

FIG. 10 is a flow chart showing specific contents of the reading check subroutine in FIG. 5.

First, at step S101, it is determined whether any original is on the original tray 20 or not. If an original is on the original tray 20, the operation enters step S103, and if not, it jumps to step S111.

Only when all the respective flags have been reset at steps S103, S105 and S107, the operation proceeds to step S109 where a read starting flag is set to start the reading operation. On the other hand, when any of those flags has been set, the operation jumps to step S111. This is because reading has been already started when the reading flag has been set at step S103, while when the respective flags have been set at steps S105 and S107, it is because the compressing/expanding portion has been used for printing or transmission and is unavailable for the reading operation.

Subsequently, setting state of the read starting flag is determined at step S111. When the read starting flag has been set, the operation proceeds to step S113 where the display a of FIG. 3 is made to require an operator to enter destination dial numbers. At step S114, the compressed data that were transmitted in the last transmission are erased. The reason for erasing the compressed data on this occasion is that the data should not be erased immediately after transmission but be held until another transmitting operation (reading operation) for the subsequent original is started by an operator, in preparation for additional key entry of manual broadcast transmission.

Meanwhile, the data erasure may be effected at any time if only the transmitting operation (in this case, including the reading operation) of the subsequent original has been already started. Therefore, for example, the time when setting of the original into the original tray is detected, destination numbers are set, or reading of the original is started may be made a reference.

When the entry of dial number is completed at step S115, processings of step S117 and the following steps are executed to perform the reading operation for the original.

At step S117, a first original is fed to the reading portion. At step S119, arrival of the original at the reading portion is detected. If the original has not yet reached the reading portion, the operation returns immediately to the main routine, but if it has, the operation proceeds to step S121. At step S121, several kinds of flags are set and at step S123, the read starting flag is reset. Thereafter, the display f of FIG. 3 is made at step S125 to inform an operator that the reading operation has been started and then the operation returns to the main routine.

FIG. 11 is a flow chart showing specific contents of the transmission check subroutine in FIG. 5.

First, existence or non-existence of transmission data is determined at step S131. If there exists no data, the operation returns to the main routine, and if there are any data to be transmitted, the operation proceeds to step S133. Only when all the respective flags have been reset at steps S133, S135, S136, S137 and S138, the operation proceeds to step S139 where the transmitting operation is started by setting the line transmission flag. On the other hand, if any of those flags has been set at these steps S133 to S138, the operation returns immediately to the main routine. This is because the compressing/expanding portion has been in use and not available for transmission when the flags have been set at steps S133 and S135, while when a line reception flag has been set at step S136, it is because the line has been occupied for a receiving operation and not available for transmission. When a record resumption flag has been set to 1 at step S137, the transmission processing is restrained since an interrupting operation is being carried out or a recording operation that has been interrupted by an interrupting operation is being resumed. When the line transmission flag has been set at step S138, the operation returns immediately to the main routine since another transmitting operation has been already started. Subsequently, the operation proceeds from step S139 to S143 erasing the compressed data that were transmitted in the last transmission. Thereafter, the display g of FIG. 3 is made at step S143 to inform an operator that the transmission has been started and then the operation returns to the main routine.

While according to the present embodiment, not those compressed data that have been once expanded and again compressed in the last transmission but the initially compressed data are stored as the transmission image data, either type of the compressed data may be stored for the additional transmission.

FIG. 12 is a flow chart showing specific contents of the reception check subroutine in FIG. 5.

First, it is determined at step S151 whether a call has been made through the telephone line or not. When a call has been made, setting state of the line transmission flag and the line reception flag is checked at steps S153 and S155 to determine whether the line is in use or not. If it is determined at steps S153 and S155 that the line is in use, the operation immediately returns to the main routine since the receiving operation can not be started. If it is determined at steps S153 and S155 that the line transmission flag and the line reception flag have been reset, the line reception flag is set at step S157 to start the receiving operation. Subsequently, the display h of FIG. 3 is made at step S159 to inform an operator that the receiving operation is being carried out and then the operation returns to the main routine.

Figure 13:
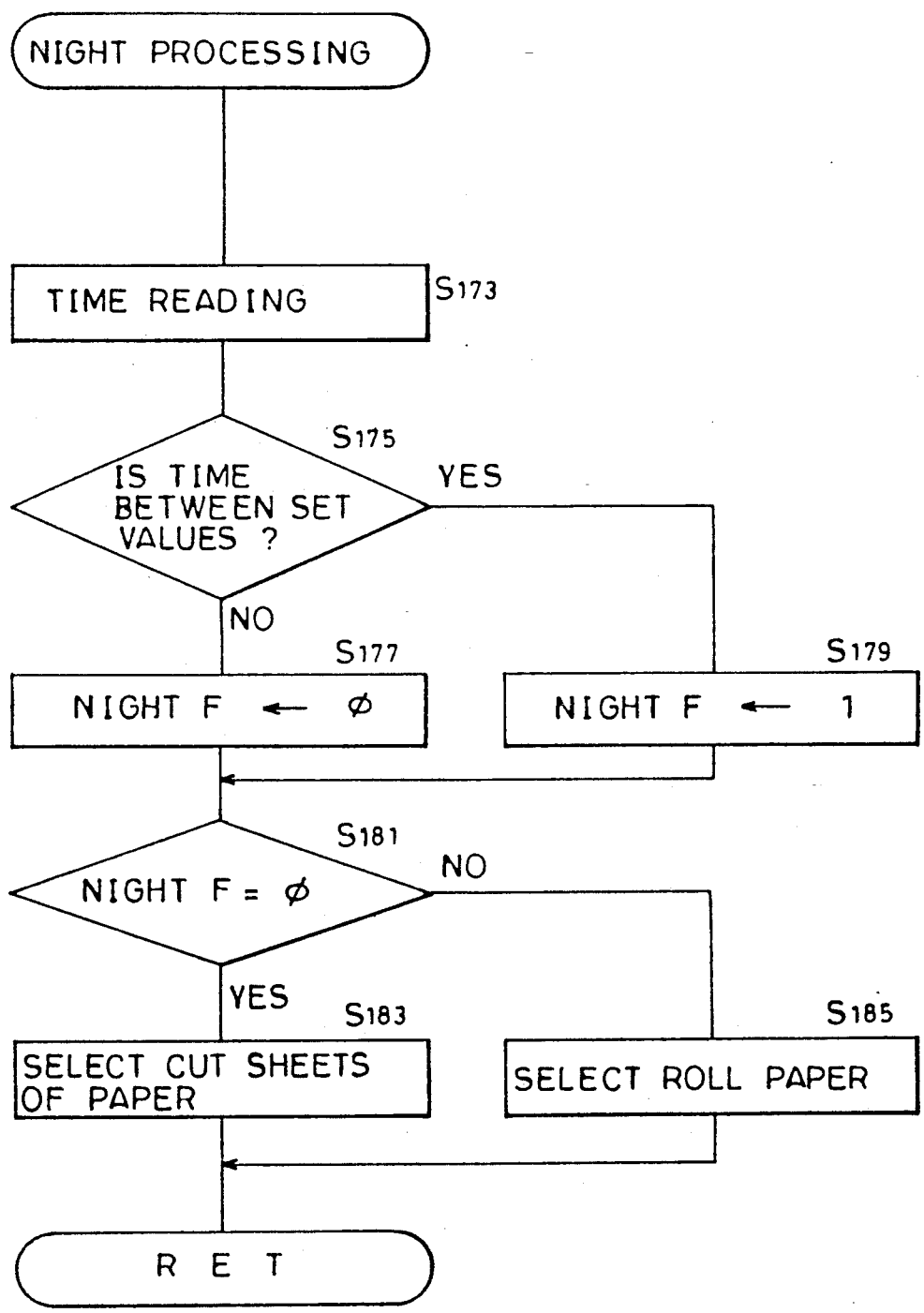
FIG. 13 is a flow chart showing specific contents of the night processing subroutine in FIG. 5.

FIG. 13 is a flow chart showing specific contents of the night processing subroutine in FIG. 5.

First, the time of day is read at step S173. The time can be detected by a clock IC 62 which is backed-up by a battery and connected to the communication control CPU 50. At step 175, it is determined whether the time is between set values (for example, from 9 a.m. to 7 p.m.). If the time is not between the set values, it is determined to be in the night so that the night flag is set at step S179. If the time is between the set values, it is determined to be in the regular time so that the night flag is reset at step S177. If the night flag has been reset at step S180, the cut sheets of paper are fed to the recording portion at step S183. On the other hand, if the night flag has been set at step S181, the roll paper is fed to the recording portion at step S185. This is generally because the roll paper has a lower possibility of causing a jam than the cut sheets of paper. In other words, if any jam occurs in the night, it can not be easily restored due to absence of operators, and this may probably lead to loss of the received data. Therefore, the roll paper with a lower possibility of causing a jam will be preferably selected in the night.

While setting of the starting and ending times that define the set values is effected by DIPSW (not shown) according to the present embodiment, it may be done by other method such as using the operation panel.

FIGS. 14A to 14D are flow charts for showing specific contents of the transmission routine in FIG. 6.

The reason why the compressed data are once returned to expanded data and again compressed in the transmission is that a transmission system called "memory transmission" is employed in the present embodiment. This transmission system is such that line connection for the transmission to a receiver-side (destination) is not made until image data of all the originals have been stored in a memory in the reading before the transmission. At the time of the data storing into the memory, however, recording capability (recording size and the like), compression method and so on of the receiver-side are unknown, so that coding of the data should be effected according to any method convenient to the transmitter-side (for example, a method with a high compression efficiency). This is because the compressed data will have to be once again expanded to acquire the initial size and then compressed to be accepted by the receiver-side when the compression method, recording size and the like of the initial compressed data do not match with those of the receiver-side in the actual communication later.

First, setting state of an expansion flag is determined at step S233. If the expansion flag has been set, setting state of a 1-block expansion flag is comprising several lines of image data. If it is determined at step S235 that the 1-block expansion flag has been reset, the operation proceeds to step S237 where compressed data of the subsequent 1 block are transferred to the expanding portion. The expanding operation is set at step S239 and the 1-block expansion flag is set at step S241.

If the 1-block expansion flag has been set at step S235, it means that a 1-block expanding operation has been already started and it is determined at step S243 whether the 1-block expansion processing has been completed or not. When the expanding processing has been completed, the 1-block expansion flag is reset at step S245, automatic scale-down is effected according to the recording size of the receiver-side (destination) at step S247 and further, where appropriate, image processing setting of the time, transmission source, printing function, non-transmission area and the like) is executed at step S249. Details of this image processing will be described later with reference to FIG. 19. Furthermore, the expanded data are once stored in the page memory at step S251, 1 block of which is compressed by resetting the expansion flag at step S253 and setting the compression flag at step S255 before the operation proceeds to step S257. Therefore, the operation of compressing the 1 block that has been just expanded and returning the thus compressed data to the compressed data memory again is sequentially repeated for all the pages.

Steps S257 to S275 relates to the compressing operation which is performed according to substantially the same sequence in the expanding operation.

First, setting state of a compression flag is determined at step S257. If the compression flag has been set, the operation proceeds to step S259, and if it has been reset, the operation proceeds to step S277 in FIG. 14B.

At step S259, the setting state of a 1-block compression flag is determined. If the 1-block compression flag has been reset, the compressing operation is set at step S261, the expanded data are transferred from the page memory to the compressing portion at step S263 and then the 1-block compression flag is set to start a 1-block compression. If the 1-block compression flag has been set (NO at step S259), it is determined whether a 1-block compression has been completed or not at step S267. If the compression has been completed, the 1-block compression flag is reset at step S269, the compressed data are transferred to the compressed image memory at step S271, the compression flag is reset at step S273 and then the expansion flag is set at step S275 to start the expanding operation, before the operation proceeds to the step S277.

At step S277, it is determined whether the above-described expanding and compressing operations have been completed until the last page. If the operations have been completed, a compression method changing flag is reset at step S279, the line transmission flag is set at step S280 and then the operation proceeds to step S291.

At step S291, setting state of the line transmission flag is determined. If the flag has been reset, the operation immediately returns to the main routine. If the flag has been set at step S291, the operation proceeds to step S293 where setting state of a transmission-connection-completed indicating flag is determined to check completion of the line connection to the receiver-side [destination]. If the transmission-connection-completed indicating flag has been reset at step S293, the operation proceeds to step S331 in FIG. 14C where the connecting operation is performed. If the flag has been set, the image data are transmitted according to the procedure represented by step S295 and the following steps.

At step S295, it is determined whether the transmission of the image data has been completed or not. If the transmission has been completed (a picture-transmission-completed indicating flag=1), the operation proceeds to step S317, and if not, the operation proceeds to step S297.

At step S297, the transmitting portion is set to transmit the image data to the telephone line. At step S301, it is determined whether transmission of one page has been completed or not and at step S303, it is determined whether transmission of all the pages has been completed or not. If the one-page transmission has not been completed, the compressed data are continuously transferred to the transmitting portion at step S313.

If the transmission has been completed for the one page but not for all the pages, the pages are renewed at step S309. When the transmission for all the pages has been completed, the picture-transmission-completed indicating flag is set at step S305 and a transmit-disconnection-completed indicating flag is reset at step S307 and then the operation returns to the main routine.

Meanwhile, when the image transmission has been completed at step S295 and the transmit disconnection processing has not been completed at step S317, a transmit disconnecting operation is performed through steps S317 to S324 in FIG. 14D.

First, line disconnection processing is executed at step S317, and it is determined at step S319 whether the line disconnection processing has been completed or not. If the disconnection processing has been completed, a line-disconnection-completed indicating flag is set at step S321, the line transmission flag is reset at step S323 and the display i shown in FIG. 3 is made at step S324 and then the operation returns to the main routine. If the disconnection processing has not been completed at step S319, the operation immediately returns to the main routine.

On the other hand, if the transmission-connection-completed indicating flag has not been set at step S293, a line connection is made at step S331 in FIG. 14C. At step S333, it is determined whether the connection processing has been completed or not. If the connection processing has been completed, the operation proceeds to step S339, and if not, the operation immediately returns to the main routine. At step S339, the respective flags are initialized and at step S341, the transmission-connection-completed indicating flag is set and then the operation returns to the main routine.

Figure 15A:
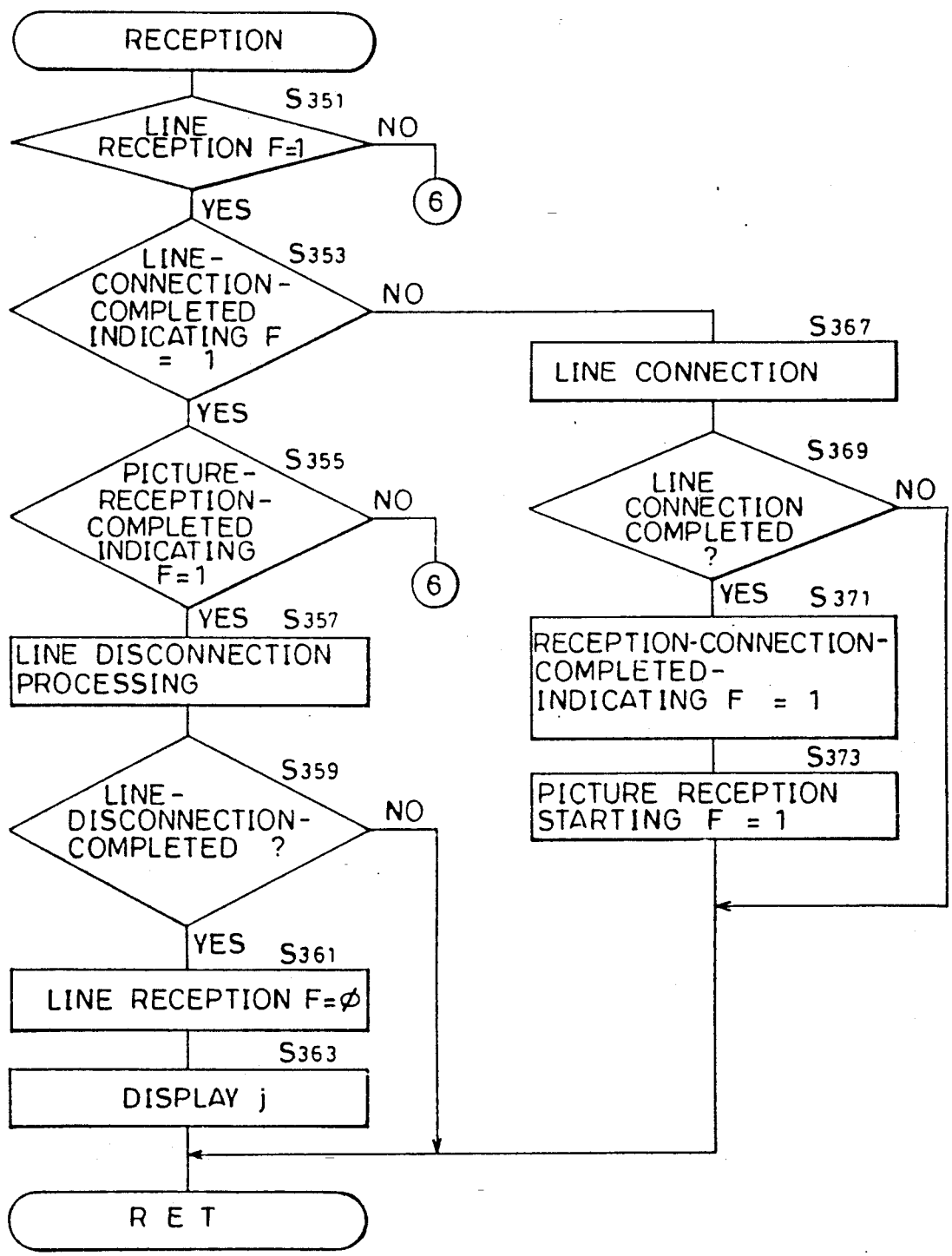

FIGS. 15A and 15B are flow charts showing specific contents of the reception routine in FIG. 6.

First, the setting state of a line reception flag is determined at step S351 to check a line reception being carried out. If the line reception is being carried out, the operation proceeds to step S353, and if not, the operation immediately proceeds to step S375 in FIG. 15B. At steps S353, 355 and 359, it is determined whether connection for the reception has been made or not, whether the reception of an image has been completed or not after the connection for the reception is made, and further whether disconnection of the reception has been completed or not after the image reception, respectively, each step having alternative predetermined steps to be selected according to its determination result.

When the line connection processing has not been completed (NO at step S353), the line connection processing is first executed at step S367 and then it is determined whether the line connection has been completed or not at step S369. If the line connection has been completed, a receive-connection-completed indicating flag is set at step S371 and a picture-connection-completed indicating flag is set at step S373 and then the operation returns to the main routine. If the line connection has not been completed, the operation immediately returns to the main routine.

When the line connection has been completed but the image reception has not been completed, the operation proceeds to step S375 in FIG. 15B where setting state of an image reception starting flag is first determined. If the image reception starting flag has been set, the receiving portion is initialized at step S377 and the image reception starting flag is reset at step S379 and then the operation returns to the main routine.

On the other hand, if the image reception starting flag has been reset, the operation proceeds to step S380 where a predetermined processing is executed to store the received image data. Whether the storage of one page has been completed or not is determined at step S381 and whether the storage of all the pages has been completed or not is determined at step S383. If it is determined at step S381 that the one-page storage has not been completed yet, the operation immediately returns to the main routine. If the all-page storage has not been completed yet at step S383, the pages to be stored are renewed, while if it has been completed a picture-reception-completed indicating flag is set at step S385, and then the operation returns to the main routine in both cases.

Meanwhile, if the picture-reception-completed indicating flag has been set at step S355, the operation proceeds to step S357 to disconnect the line. Whether the disconnection processing has been completed or not is determined at step S359. If it has been completed, the line reception flag is reset at step S361 and the display j in FIG. 3 is made at step S363 to complete the receiving operation, but if not (NO at step S359), the operation immediately returns to the main routine and continues the disconnection processing.

Figure 16A:
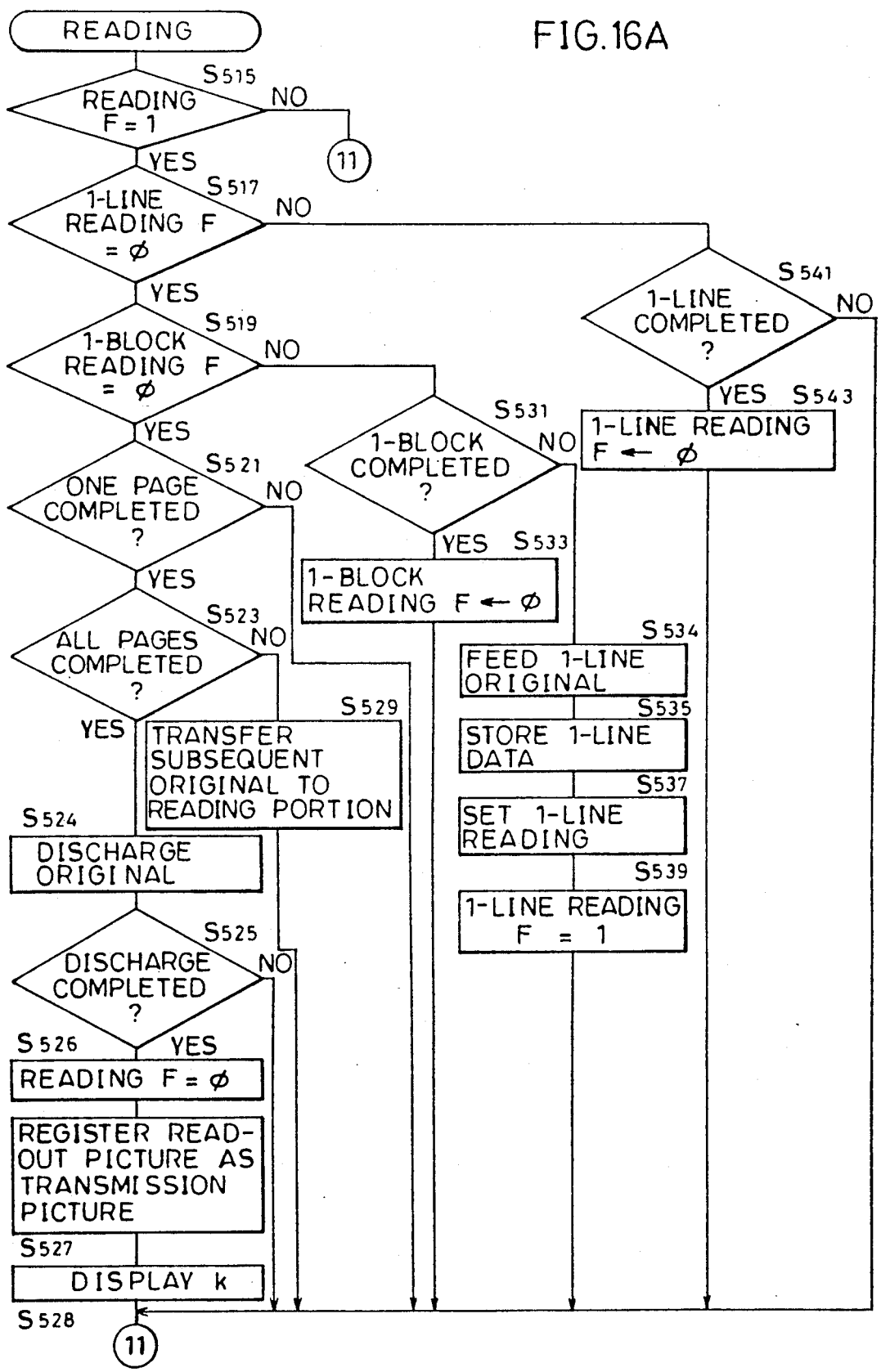
FIGS. 16A and 16B are flow charts showing specific contents of the reading-out processing subroutine in FIG. 6.
Figure 16B:
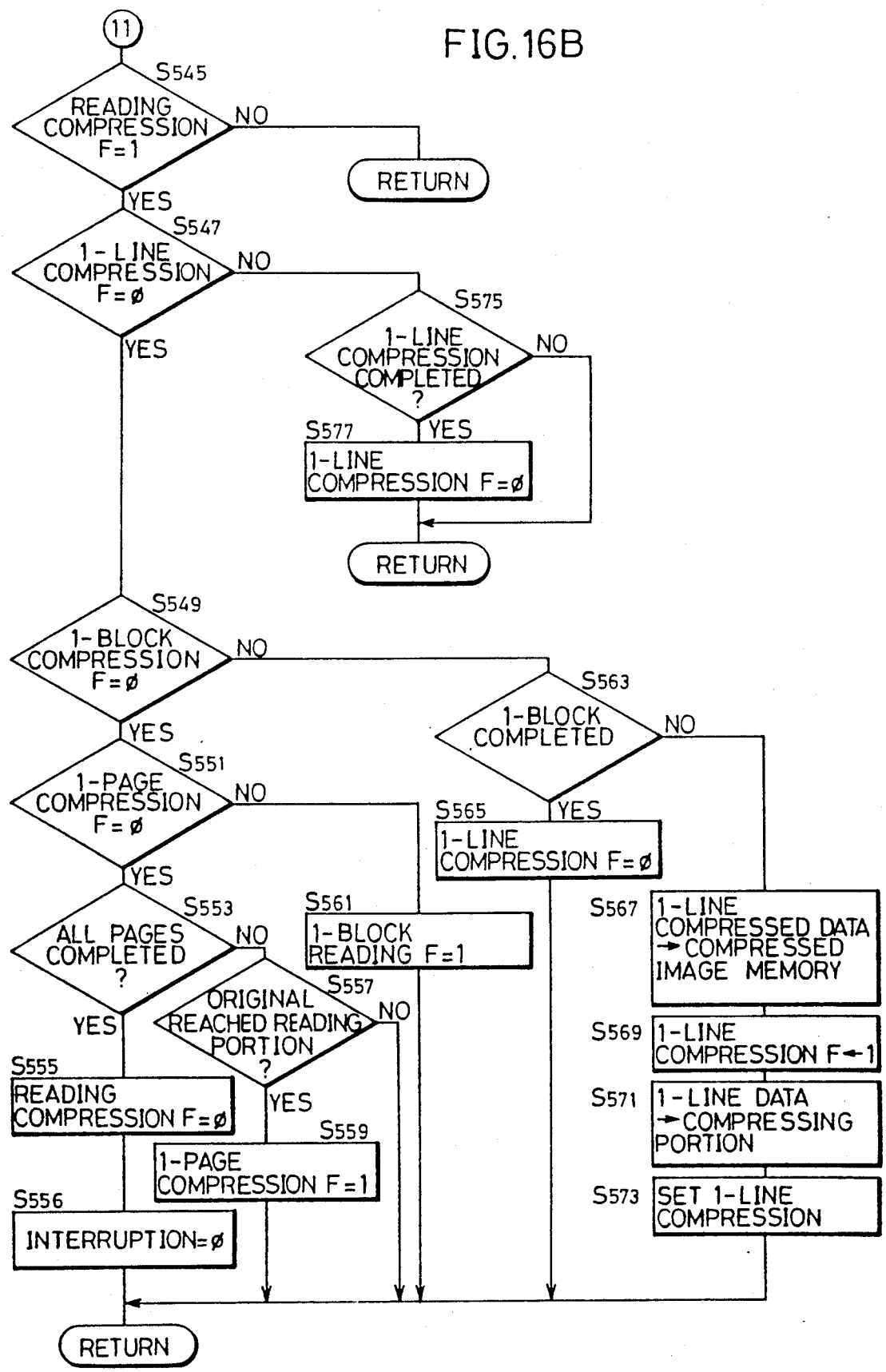

FIGS. 16A and 16B are flow charts showing specific contents of the reading routine in FIG. 6.

FIG. 16A in particular shows a control flow of the IR unit and an original feeding motor in the reading.

First, if the reading flag has been set at step S515, it means that the reading sensor and an original feeding pulse motor is under control and the operation proceeds to step S517 and the following steps, while if not, the operation immediately proceeds to step S545 in FIG. 16B.

At steps S517 to S521, it is determined whether a one-line reading has been completed or not, whether a one-block reading has been completed or not and whether a one-page reading has been completed or not, respectively.

If the one-line reading has not been completed yet at step S517, the operation proceeds to step S541 where it is determined whether the one-line reading has been completed or not. Only when the one-line reading has been completed, a one-line reading flag is reset at step S543 and then the operation proceeds to step S545.

If the one-block reading has not been completed at step S519, the operation proceeds to step S531 where it is determined whether the one-block reading has been completed or not. If the one-block reading has been completed, a one-block reading flag is reset at step S533 and then the operation proceeds to step S545. If the one-block reading has not been completed yet at step S531, the operation proceeds to step S534 and processing is executed along steps S534 to S539. More specifically, one-line data of the original are transferred at step S534 and stored at step S535, setting for reading the subsequent one-line data is made at step S537, and then the one-line reading flag is set at step S539.

When the one-page reading has been completed at step S521, image processing (printing of transmission source and the like) is executed at step S522 and whether the all-page reading has been completed or not is determined at step S523.

When it is determined that the all-page reading has been completed at step S523, the original is discharged at step S524 and it is determined at step S525 whether the discharge has been completed or not. If the discharge of the original has not been completed at step S525, the operation immediately proceeds to step S545. If the discharge has been completed, the reading flag is reset at step S526, the read-out image is registered as a transmission image at step S527 and the display k in FIG. 3 is made at step S528, and then the operation proceeds to step S545. If the all-page reading has not been completed yet at step S523, the subsequent original is fed to the reading portion at step S529.

FIG. 16B generally shows processing by the compressing portion in the reading.

First, at steps S545, S547, S549 and S551, the setting state of a reading compression flag to be set in the reading, a one-line compression flag to be set in the one-line compression, a one-block compression flag to be set in the one-block compression, and a one-page compression flag to be set in the one-page compression are determined, respectively.

When the reading compression flag has been reset at step S545, or when compression in the reading is not required, the operation immediately returns to the main routine. If compression is required in the reading and the one-line compression is being carried out at step S547, the operation proceeds to step S575 to determine whether the one-line compression has been completed or not. Only when the one-line compression has been completed, the one-line compression flag is reset at step S577 and then the operation returns to the main routine.

If it is determined that the one-line compression is not being carried out at step S547 and that the one-block compression is being carried out at step S549, the operation proceeds to step S563 where it is determined whether the one-block compression has been completed or not. If it has been completed, the one-block compression flag is reset at step S565 and then the operation returns to the main routine. If the one-block compression has not been completed yet at step S563, one line of the compressed data is stored at step S567. Furthermore, at steps S569 to S573, the one-line compression flag is set, the one-line compressed data are transferred to the compressing portion and a command of the one-line compression is set, respectively, and then the operation returns to the main routine.

If the one-block compression is not being carried out at step S549, the operation proceeds to step S551 where it is determined whether the one-page compression is being carried out. If the one-page compression is being carried out, a block reading flag is set at step S561 to activate feeding of the original for the reading. If the compression is not being carried out at step S551, the operation proceeds to step S553 where it is determined whether the all-page compression processing has been completed or not. If it has not been completed yet, then it is determined at step S557 whether the subsequent original has reached the reading portion or not. If it has not reached the reading portion yet, the operation immediately returns to the main routine, and if it has, the one-page compression flag is set to start the compressing operation for the subsequent page.

If it is determined at step S553 that the all-page compression processing has been completed, the reading compression flag is reset at step S555, the interruption flag is reset to 0 at step S556 to resume the recording operation that has been interrupted by an interrupting operation when the reading of an interrupting original is completed, and thus the compressing operation is completed before the operation returns to the main routine.

Figure 17B:
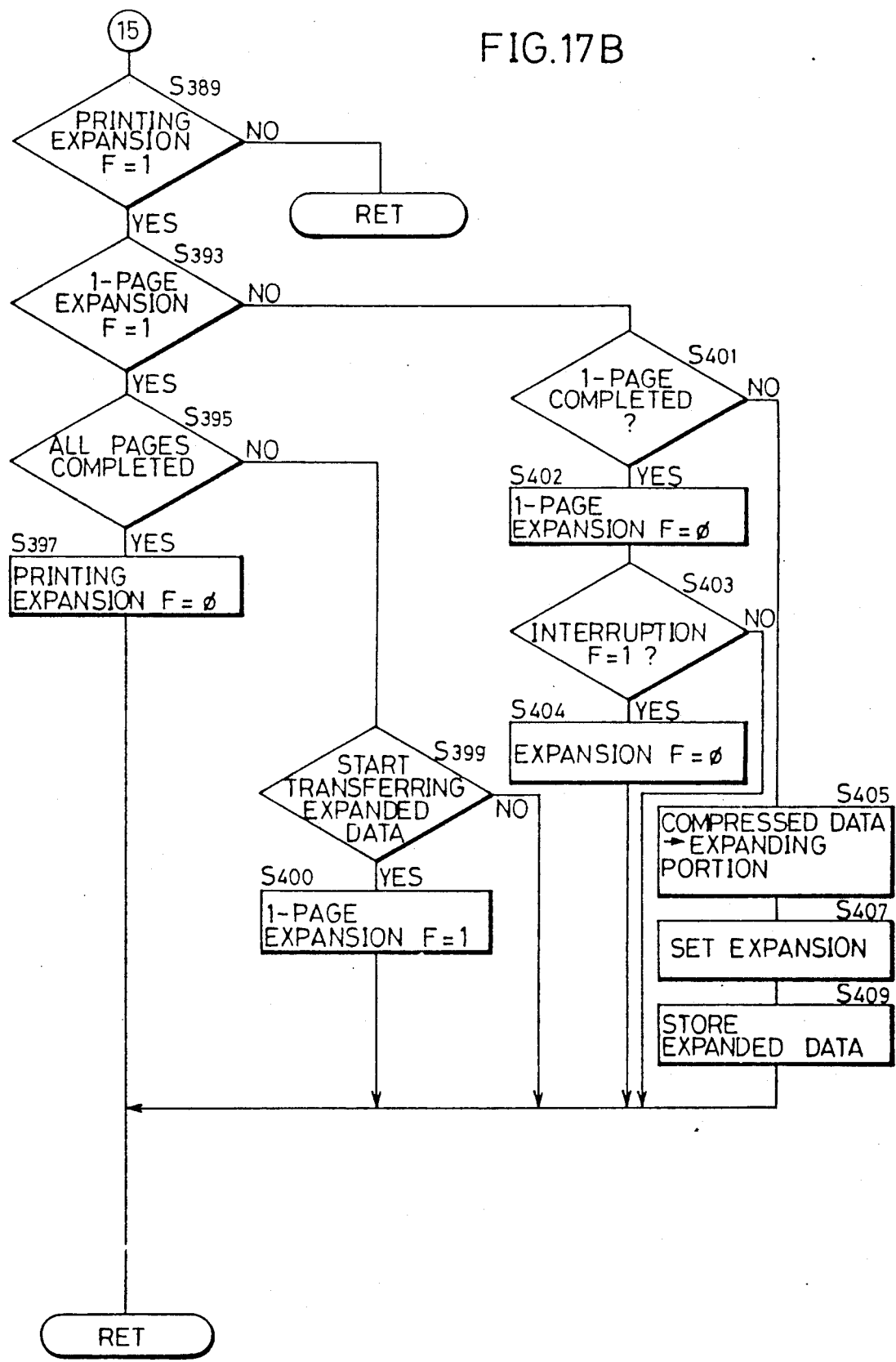

FIGS. 17A and 17B are flow charts showing specific contents of the printing routine in FIG. 6.

First, the setting state of a print starting flag is determined at step S601. If the flag has not been set, or if the print starting should not be activated yet, the operation immediately proceeds to step S611. If the print starting is to be activated, the setting state of a printing expansion flag is determined at step S603. This is for the purpose of preventing image data transfer to the printing portion when the expanding operation has not been started yet.

When the printing expansion flag has been set at step S603, a print flag is set at step S605, a print activating command is delivered at step S607 and the print starting flag is reset at step S609. If the printing expansion flag has not been set at step S603, the operation immediately proceeds to step S611.

At step S611, the setting state of the print flag is determined. If the print flag has not been set yet, the operation proceeds to step S389 in FIG. 17B. If it has been set, it is determined at step S613 whether a one-page print starting signal from the printing portion has been received or not. If it has been received, transfer of one-page data is started at step S615. At step S617, whether the one-page transfer has been completed or not is determined. If it has not been completed, the operation proceeds to step S389. If it has been completed, the operation proceeds to step S619 where the setting state of the interruption flag is determined. This interruption flag is set so as to temporarily stop printing, thereby allowing an operator to read another original during the printing, and to resume the thus interrupted printing upon completion of the reading. According to the present embodiment, the interruption takes place between pages. In other words, even when an interruption request is made during printing of one page, it is not accepted until the end of recording of the page. If the interruption flag has not been set, the operation proceeds to step S625. If it has been set, the print flag is reset at step S621, the printing is stopped at step S622 and the interrupted image data that have not been printed are registered again as a print image at step S623. Further, a record resuming flag is set at step S624 and then the operation proceeds to step S625. At step S625, it is determined whether data transfer of all the pages has been completed or not. If it has been completed, the print flag is reset at step S627 and the printing is stopped at step S629, and then the operation proceeds to step S630. At step S630, it is determined whether a transmission image corresponds to the interrupted image data that have been registered at step S623. If it does, the record resuming flag is reset at step S631 and then the operation proceeds to step S389. If this record resuming flag has been set, priority is given to the resumption of recording after another original of a user is read for an interrupting transmission.

While according to the present embodiment, after the reading of an original for the interrupting transmission, priority is given to the resumption of recording, it may of course be given to the transmission (to the line) or the reading and the transmission to the line may be executed at a time.

In order to perform the former control (transmission priority), a resumption before transmission flag is set at step S624 instead of the record resuming flag, and the operation does not proceed to steps S630 and S631 but it is determined between steps S303 and S305 whether the image data correspond to the transmission image for the interrupting transmission or not. If the image data correspond to the transmission image, the resumption before transmission flag is reset and the operation does not proceed to step S137 but between steps S70 and S71 the setting state of the resumption before transmission flag is determined. If the flag has been set, the operation needs only to immediately return to the main routine.

The processing of steps S389 to S409 in FIG. 17B represents a sequence along which one-page compressed image data are expanded and stored in the page memory.

First, whether the printing expansion flag has been set or not, or the expanding operation is being carried out or not is determined at step S389. If the printing expansion flag has not been set, the operation immediately returns to the main routine while if it has, the operation proceeds to step S393 and the following steps.

At steps S393 and S395, it is determined whether one-page expansion processing has been completed or not and whether all-page expansion processing has been completed or not, respectively. If the all-page expansion processing has been completed at step S395, the printing expansion flag is reset at step S397 and then the operation returns to the main routine. On the other hand, if the all-page expansion processing has not been completed, the operation proceeds to step S399 where it is determined whether transfer of the one-page expanded image data to the printer has been started or not. If the transfer has not been started, the operation immediately returns to the main routine since it can not enter the subsequent expanding operation. This is to prevent overwriting of the expanded data in the same area. If the transfer of the expanded data to the printing portion has been started, a one-page expansion flag is set at step S400. If the one-page expansion flag has been reset at step S393, it means that a one-line expansion processing in one page has been completed and thus the operation proceeds to step S401 and executes the following processing.

First, it is determined at step S401 whether the one-page expansion processing has been completed or not. If it has been completed, the one-page expansion flag is reset at step S402 and then setting state of the interruption flag is determined at step S403. If the interruption flag has been set, the expansion flag is reset at step S404 to stop the expansion processing and then the operation returns to the main routine. If the one-page expansion processing has not been completed at step S401, one-line compressed data are transferred to the expanding portion at step S405 and the expanding operation is set at step S407 thereby to make the expansion setting for the subsequent line. The expanded data are stored in the page memory at step S409 and then the operation returns to the main routine.

Figure 18B:
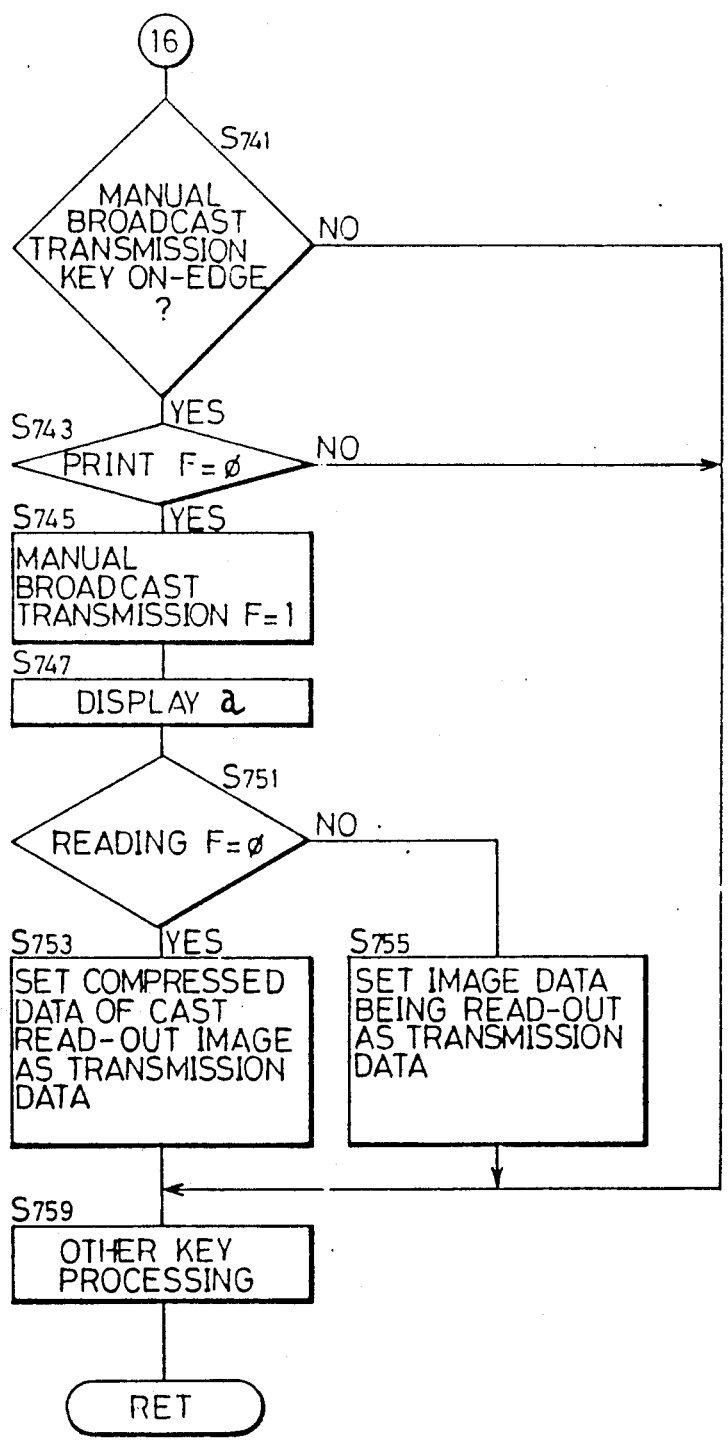

FIGS. 18A and 18B are flow charts showing specific contents of the key processing routine in FIG. 6.

First, entry processing with the ten-key, or the key 40 in FIG. 2 is executed at step S701 and then the operation proceeds to step S703. At step S703, it is determined whether the ON-edge of the transmission key has been detected or not. If it has been detected, a value in a buffer entered from the ten-key is registered as a destination number at step S705.

The operation then proceeds to step S707 where it is determined whether the ON-edge of the interruption key 43 has been detected or not. Only when it has been detected, the operation proceeds to steps S709 to S713. More specifically, setting state of the print flag is determined at step S709. If the print flag has been set, or if printing is being carried out, the operation proceeds to step S711 where the display c of FIG. 3 is made to inform an operator that an interrupting operation is possible upon completion of the one-page printing, and then the interruption flag is set at step S713. Since the interruption flag is valid only when printing is being carried out, if the print flag has been reset at step S709, the operation jumps steps S711 and S713.

The operation then proceeds to step S715 where it is determined whether the ON-edge of the transmission key 45 has been detected or not. If it has been detected, the operation proceeds to step S717 where a non-transmission register flag is set, and at step S719, the display b of FIG. 3 is made to require an operator to enter width of a non-transmission area. While according to the present embodiment, the non-transmission area is positioned along a lower edge, other areas such as a lower right corner may of course be designated as the non-transmission area. If the ON-edge of the non-transmission key has not been detected at step S715, the operation jumps steps S717 and S719.

At step S721, the setting state of the non-transmission register flag is determined. If it has been set, register, or key entry of the non-transmission area has been made or not is determined at step S723. If the key entry has been made, numeral values by the key entry are registered as the non-transmission area width at step S725 and a non-transmission area flag is set at step S727.

Step S741 and the following steps in FIG. 18B represent a flow of the processing by the manual broadcast transmission key (key 44 in FIG. 2).

First, whether the ON-edge of the manual broadcast transmission key has been detected or not is determined at step S741. If it has been detected, whether printing is being carried out or not is determined by identifying the print flag at step S743. If printing is being carried out, entry by the manual broadcast transmission key is not accepted and the operation immediately proceeds to step S759 unless the printing operation is once stopped with the interruption key 43. If printing is not being carried out (YES at step S743), the operation proceeds to the step S745 where the manual broadcast transmission flag is set, and at step S747, the display a of FIG. 3 is made to require an operator to enter a dial number.

At step S751, the setting state of the reading flag is determined. According to the setting state of the reading flag, an image for the transmission is selected. More specifically, if the reading flag has not been set at step S751, the operation proceeds to step S753 where the last read-out compressed image data are set as the transmission data. On the other hand, if the reading flag has been set at step S751, the operation proceeds to the step S755 where the image data just being read out are set as the transmission data. Finally, other processing concerning the operation display is executed at step S759 and then the operation returns to the main routine.

Figure 14A:
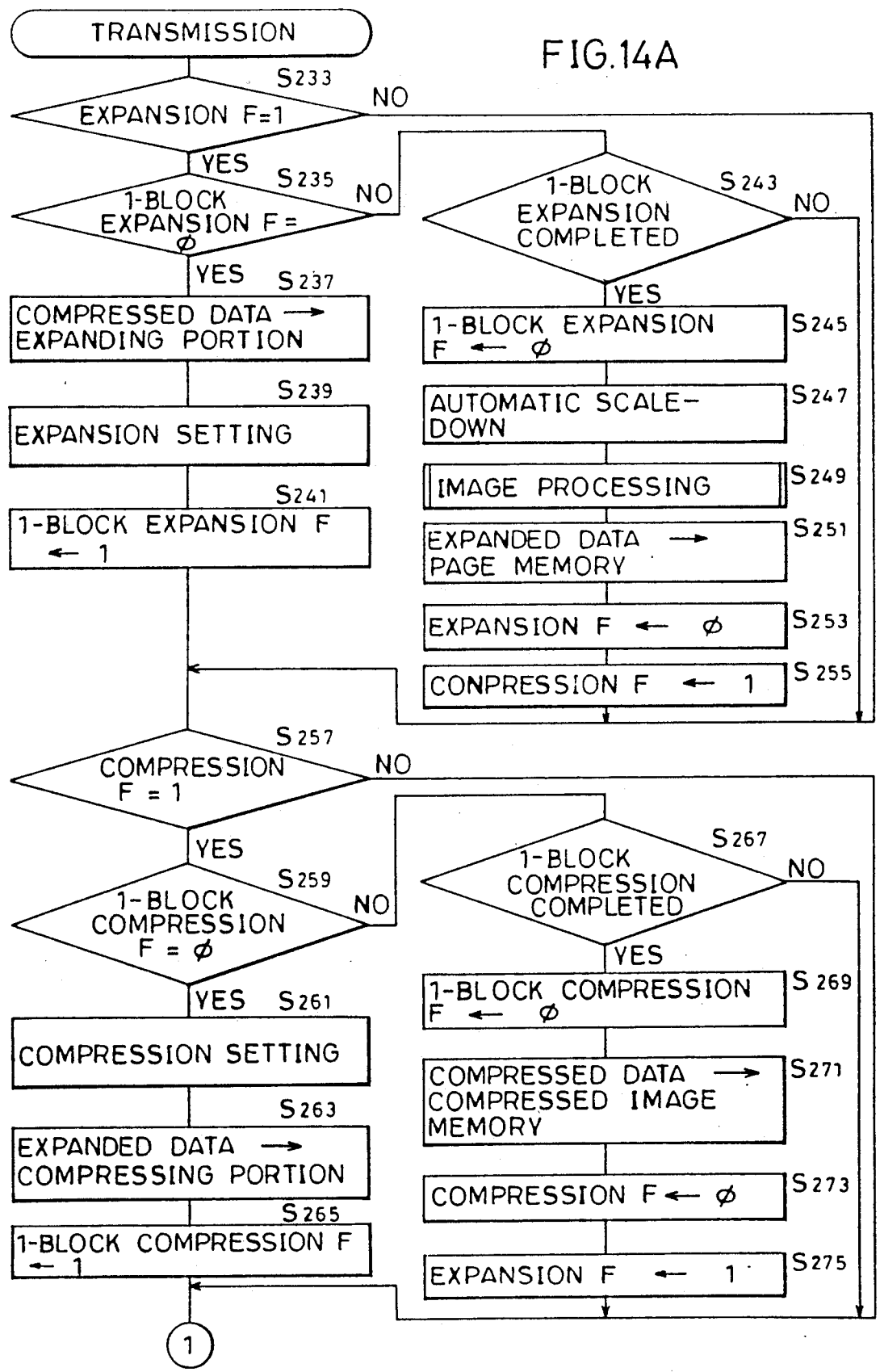
Figure 19:
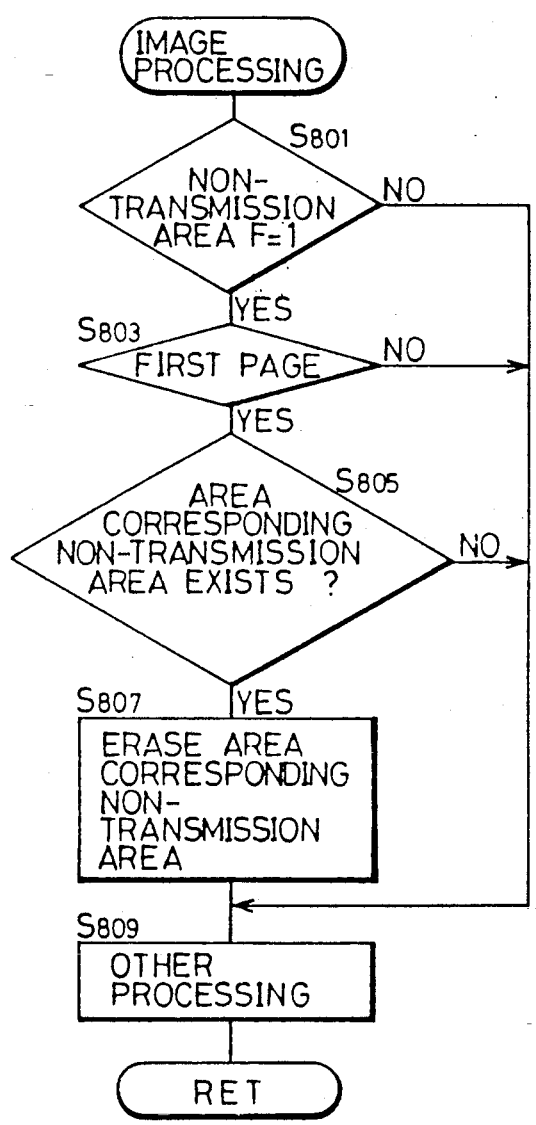
FIG. 19 is a flow chart showing specific contents of the image processing routine in FIG. 14A.

FIG. 19 is a flow chart showing specific contents of the image processing at step S249 in FIG. 14A.

First, the setting state of the non-transmission area flag is determined at step S801 to judge whether non-transmission processing should be executed or not. If the non-transmission processing is to be executed, the operation proceeds to step S803 where it is determined whether the processing is being executed on the first page or not. According to the present embodiment, the non-transmission area is provided as an area in which a destination FAX number or the like can be written in case that an operator leaves the transmission to another operator. Therefore, the non-transmission processing is limited to the first page of the original to be transmitted. It may be of course possible, however, to set a format in which a certain portion of an original is never transmitted and to execute the non-transmission processing for every page. At step S805, it is determined whether there exists any portion corresponding to the non-transmission area in one block which has been expanded into the page memory. If there exists a portion corresponding to the non-transmission area, the operation proceeds to step S807 where 0 (0 represents blank data) is written in the corresponding area as image data to erase the area. At step S809, other image processing such as recording of the transmission source is executed, and then the operation returns to the main routine.

While according to the embodiment above, a laser printer is applied to the printing portion, other printers may also be applied if only it has the merit of outputting data in a lump.

Further, while according to the embodiment above, the lump record processing is directed to use in the night, it may also be utilized on holidays or in absence of operators in the day time.

Furthermore, while according to the embodiment above, the memory amount of the picture memory is taken as a reference of a predetermined amount for the image data, a predetermined number of leaves of the received data may also be taken as a reference.

Furthermore, while according to the embodiment above, the present invention is applied to a facsimile apparatus having both the transmitting and receiving functions, it may also be applied to a reception-only facsimile apparatus, providing the same effects.

As has been described above, according to the present invention, if a specific mode such as for the night has been selected, the recording means is not activated until the received image data reach a predetermined amount. Therefore, the frequency of activating the recording means is reduced and this contributes to saving of energy or improving durability of the parts.

Additionally, when the specific mode is cancelled as at dawn, the image data received during the specific mode are recorded on recording paper just as in the regular time, so that any inconvenience can not arise for practical use.

What is claimed is:

1. A facsimile apparatus comprising:
   clock means for clocking the time of day;
   setting means for setting one of operation modes of the apparatus which include first and second modes, in response to clock output of said clock means;
   receiving means for receiving image data from a transmitter-side;
   storage means for storing the image data received by said receiving means;
   recording means for printing out the image data stored in said storage means;
   detecting means for detecting that the image data stored in said storage means have reached a predetermined amount; and
   control means for activating said recording means in response to detection output of said detecting means when said first mode has been set, and activating said recording means in response to reception by said receiving means when said second mode has been set, irrespective of the detection output of said detecting means.

2. The facsimile apparatus according to claim 1, wherein
   said first mode is one corresponding to an operation at night or on holidays, and said second mode is one corresponding to another operation for any time other than night and holidays.

3. The facsimile apparatus according to claim 1, wherein said recording means includes an electrophotographic recording section.

4. The facsimile apparatus according to claim 3, wherein said electrophotographic recording section has a heater for fixing a toner image onto a paper.

5. The facsimile apparatus according to claim 4, wherein said heater is kept in an OFF condition until said detecting means detects that the image data stored in said storage means have reached the predetermined amount when said first mode has been set, and executes a temperature control operation at any time when said second mode has been set.

6. The facsimile apparatus according to claim 1, wherein said recording means includes first and second paper supply portions.

7. The facsimile apparatus according to claim 6, wherein the image data are printed out on a paper supplied from said first paper supply portion when said first mode has been set and on a paper supplied from said second paper supply portion when said second mode has been set.

8. A facsimile apparatus operable in first and second modes, comprising:
   clock means for clocking the time of day;
   setting means responsive to said clock means for setting one of the first and second modes;
   receiving means for receiving image data from a transmitter-side;
   storage means for storing the image data received by said receiving means;
   recording means for printing out the image data stored in said storage means;
   detecting means for detecting that the image data stored in said storage means have reached a predetermined amount;
   first control means operable in the first mode and responsive to said detecting means for activating said recording means; and
   second control means operable in the second mode and responsive to said receiving means for activating said recording means.

9. The facsimile apparatus according to claim 8, wherein said recording means includes an electrophotographic recording section.

10. The facsimile apparatus according to claim 9, wherein said electrophotographic recording section has a heater for fixing a toner image onto a paper.

11. The facsimile apparatus according to claim 10, wherein said heater is kept in an OFF condition until said detecting means detects that the image data stored in said storage means have reached the predetermined amount when said first mode has been set, and executes a temperature control operation at any time when said second mode has been set.

12. The facsimile apparatus according to claim 8, wherein said recording means includes first and second paper supply portions.

13. The facsimile apparatus according to claim 12, wherein the image data are printed out on a paper supplied from said first paper supply portion when said first mode has been set and on a paper supplied from said second paper supply portion when said second mode has been set.

14. A facsimile apparatus, comprising:
   clock means for clocking the time of day;
   setting means for setting one of night mode and daytime mode in response to clock output of said clock means;
   receiving means for receiving image data from a transmitter-side;
   storage means for storing the image data received by said receiving means;
   recording means including an electrophotographic recording section for printing out the image data stored in said storage means;
   detecting means for detecting that the image data stored in said storage means have reached a predetermined amount; and
   control means for activating said recording means in response to detection output of said detecting means when said night mode has been set, and activating said recording means in response to reception by said receiving means when said daytime mode has been set, irrespective of the detection output of said detecting means.

* * * * *

UNITED STATES PATENT AND TRADEMARK OFFICE
CERTIFICATE OF CORRECTION

PATENT NO. : 5,177,620

DATED : January 5, 1993

INVENTOR(S) : Shigenobu Fukushima

It is certified that error appears in the above-identified patent and that said Letters Patent is hereby corrected as shown below:

In Col. 5, line 44, after "$T_1$", insert --.-- (period).

In Col. 9, line 8, between "is" and "comprising", insert --determined at step S235, where 1 block represents a unit--.

In Col. 9, line 24, before "setting", insert --(-- (parenthesis).

Signed and Sealed this

Twenty-sixth Day of October, 1993

Attest:

BRUCE LEHMAN

Attesting Officer     Commissioner of Patents and Trademarks